US010168873B1

(12) United States Patent
Holz et al.

(10) Patent No.: US 10,168,873 B1
(45) Date of Patent: Jan. 1, 2019

(54) VIRTUAL INTERACTIONS FOR MACHINE CONTROL

(71) Applicant: Leap Motion, Inc., San Francisco, CA (US)

(72) Inventors: David S Holz, San Francisco, CA (US); Raffi Bedikian, San Francisco, CA (US); Adrian Gasinski, San Francisco, CA (US); Maxwell Sills, San Francisco, CA (US); Hua Yang, Millbrae, CA (US); Gabriel Hare, Daly City, CA (US)

(73) Assignee: LEAP MOTION, INC., San Francisco, CA (US)

( * ) Notice: Subject to any disclaimer, the term of this patent is extended or adjusted under 35 U.S.C. 154(b) by 555 days.

(21) Appl. No.: 14/527,742

(22) Filed: Oct. 29, 2014

Related U.S. Application Data

(60) Provisional application No. 61/897,186, filed on Oct. 29, 2013.

(51) Int. Cl.
*G06F 5/01* (2006.01)
*G06T 19/00* (2011.01)
*G06F 3/0484* (2013.01)
*G06F 3/01* (2006.01)

(52) U.S. Cl.
CPC .......... *G06F 3/04842* (2013.01); *G06F 3/017* (2013.01); *G06T 19/006* (2013.01)

(58) Field of Classification Search
CPC ....... G06F 3/014; G06F 3/017; G06T 19/006; A61B 34/10; A61B 2034/101–2034/108
See application file for complete search history.

(56) References Cited

U.S. PATENT DOCUMENTS

| | | | |
|---|---|---|---|
| 9,383,895 B1 * | 7/2016 | Vinayak | .......... G06F 3/017 |
| 2007/0067798 A1 | 3/2007 | Wroblewski | |
| 2009/0319892 A1 | 12/2009 | Wright et al. | |
| 2011/0164029 A1 * | 7/2011 | King | .......... G06F 3/04883 345/419 |
| 2012/0013613 A1 | 1/2012 | Vesely | |
| 2012/0110447 A1 | 5/2012 | Chen | |

(Continued)

OTHER PUBLICATIONS

Anderson, Thomas et al. (US PGPUB 20100261526) (hereinafter Anderson, T) Hurst et al. (NPL "Gesture-based interaction via finger tracking for mobile augmented reality") Citation: Hürst, Wolfgang, and Casper Van Wezel. "Gesture-based interaction via finger tracking for mobile augmented reality." Multimedia Tools and Applications 62.1 (2013): 233-.*

(Continued)

*Primary Examiner* — Diane Wills
(74) *Attorney, Agent, or Firm* — Haynes Beffel & Wolfeld LLP; Ernest J. Beffel, Jr.

(57) ABSTRACT

The technology disclosed relates to providing simplified manipulation of virtual objects by detected hand motions. In particular, it relates to a detecting hand motion and positions of the calculation points relative to a virtual object to be manipulated, dynamically selecting at least one manipulation point proximate to the virtual object based on the detected hand motion and positions of one or more of the calculation points, and manipulating the virtual object by interaction between the detected hand motion and positions of one or more of the calculation points and the dynamically selected manipulation point.

25 Claims, 16 Drawing Sheets

Multiple Handed Interactions 407

(56) References Cited

U.S. PATENT DOCUMENTS

| | | | | |
|---|---|---|---|---|
| 2012/0117514 | A1* | 5/2012 | Kim | G06F 3/011 715/849 |
| 2013/0169594 | A1* | 7/2013 | Yi | G06F 3/011 345/175 |
| 2014/0015831 | A1 | 1/2014 | Kim et al. | |
| 2014/0104206 | A1* | 4/2014 | Anderson | G06F 3/017 345/173 |
| 2014/0104274 | A1 | 4/2014 | Hilliges et al. | |
| 2014/0333560 | A1* | 11/2014 | Kramer | G06F 3/04883 345/173 |
| 2015/0016777 | A1 | 1/2015 | Abovitz et al. | |
| 2015/0153833 | A1 | 6/2015 | Pinault et al. | |

OTHER PUBLICATIONS

Schlattmann et al. (NPL "3d Interaction Techniques for 6 DOF Markerless Hand-Tracking") Citation: Schlattmann, Markus, Tanin Na Nakorn, and Reinhard Klein. "3d interaction techniques for 6 dof markerless hand-tracking." (2009).*

Zachmann (NPL "Virtual Reality in Assembly Simulation—Collision Detection, Simulation Algorithms, and Interaction Techniques") Citation: Zachmann, Gabriel. Virtual reality in assembly simulation-collision detection, simulation algorithms, and interaction techniques. Diss. Zachmann, Gabriel, 2000, p. 215-233.*

U.S. Appl. No. 14/541,078—Office Action dated Oct. 21, 2016, 22 pages.

U.S. Appl. No. 14/541,078—Response to Office Action dated Oct. 21 2016 filed Jan. 23, 2017, 15 pages.

U.S. Appl. No. 14/541,078—Final Office Action dated May 19, 2017, 21 pages.

U.S. Appl. No. 14/530,364—Office Action dated Mar. 13, 2017, 35 pages.

Melax, S., et al., "Dynamics Based 3D Skeletal Hand Tracking", Proceedings of Graphics Interface 2013. Canadian Information Processing Society, 2013. 8 pages.

Montgomery, K., et al. "Spring: A General Framework for Collaborative, Real-Time Surgical Simulation." Studies in health technology and informatics(2002), 8 pages.

Wang, R., et al. "6D Hands: Markerless Hand-Tracking for Computer Aided Design" Proceedings of the 24th Annual ACM Symposium on User Interface Software and Technology. ACM, 2011, 8 pages.

Wang, X., et al. "Tracking of Deformable Human Hand in Real Time as Continuous Input for Gesture-Based Interaction", Proceedings of the 12th International Conference on Intelligent User Interfaces. ACM, 2007, 8 pages.

U.S. Appl. No. 14/530,364—Response to Office Action dated Mar. 13, 2017, filed May 31, 2017, 12 pages.

U.S. Appl. No. 14/541,078—Response to Final Office Action dated May 19, 2017, filed Aug. 7, 2017, 16 pages.

U.S. Appl. No. 14/541,078—Supplemental Response to Final Office Action dated May 19, 2017, filed Sep. 6, 2017, 15 pages.

U.S. Appl. No. 14/530,364—Office Action dated Sep. 8, 2017, 19 pages.

Izadi, Shahram, et al. "KinectFusion: Real-Time 3D Reconstruction and Interaction Using a Moving Depth Camera" Proceedings of the 24th annual ACM symposium on User interface software and technology, Oct. 16-19, 2011, 10 pages.

* cited by examiner

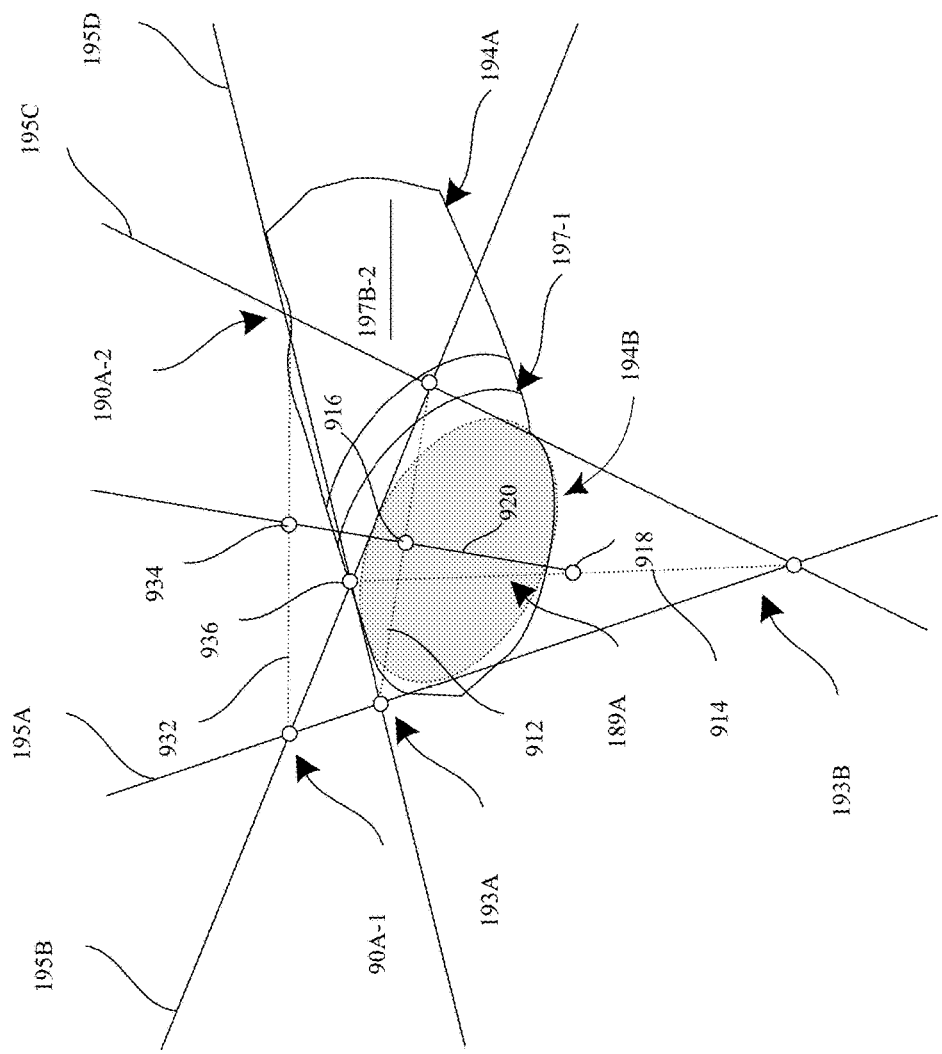

VIRTUAL INTERACTIONS FOR MACHINE CONTROL

PRIORITY DATA

This application claims the benefit of U.S. Provisional Patent Application No. 61/897,186, entitled, "VIRTUAL INTERACTIONS FOR MACHINE CONTROL," filed on Oct. 29, 2013. The provisional application is hereby incorporated by reference for all purposes.

TECHNICAL FIELD

Embodiments relate generally to machine user interfaces, and more specifically to the use of virtual objects as user input to machines.

DISCUSSION

Conventional machine interfaces are in common daily use. Every day, millions of users type their commands, click their computer mouse and hope for the best.

Unfortunately, however, these types of interfaces are very limited.

Therefore, what is needed is a remedy to this and other shortcomings of the traditional machine interface approaches.

SUMMARY

Aspects of the systems and methods described herein provide for improved control of machines or other computing resources based at least in part upon enhancing a virtual reality primitive or construct based upon sensed information indicating commands and/or other inputs. Embodiments can enable modeling of physical objects, created objects and interactions with various combinations thereof for machine control or other purposes.

The technology disclosed relates to simplified manipulation of virtual objects by detected hand motions. In one embodiment, a detected hand includes calculation points of potential interaction with a manipulation point of a virtual object. In particular, the technology disclosed relates to detecting hand motion and positions of the calculation points relative to the virtual object to be manipulated, dynamically selecting at least one manipulation point proximate to the virtual object based on the detected hand motion and positions of one or more of the calculation points, and manipulating the virtual object by interaction between the detected hand motion and positions of one or more of the calculation points and the dynamically selected manipulation point. In another embodiment, opposable motion and positions of the calculation points of the hand are detected.

In some embodiments, the technology disclosed relates to detecting opposable motion and positions of the calculation points of the hand, detecting the manipulation point proximate to a point of convergence of the opposable calculation points, and assigning a strength attribute to the manipulation point based on a degree of convergence of the opposable calculation points. In one embodiment, the dynamically selected manipulation point is selected from a predetermined list of available manipulation points for a particular form of the virtual object. In another embodiment, the dynamically selected manipulation point is created proximate to the virtual object based on the detected hand motion and positions of the calculation points.

In some embodiments, the hand and the virtual object both have anchor points and force applied by the calculation points through the manipulation point is calculated between a hand anchor point and a virtual object anchor point. In other embodiments, the technology disclosed relates to generating data for augmented display representing a position of the virtual object relative to a direct view of the detected hand. In yet other embodiments, the technology disclosed relates to generating data for display representing positions in a rendered virtual space of the virtual object and the detected hand. In yet another embodiment, the technology disclosed relates to manipulating the virtual Object responsive to a proximity between a virtual representation of the detected hand generated using the data for display and the manipulation point of the virtual object. In a further embodiment, the calculation points include finger tips and a base of the hand.

The technology disclosed also relates to detecting motion of two hands, dynamically selecting two manipulation points proximate to opposed sides of the virtual object, defining a selection plane through the virtual object linking the two manipulation points, and manipulating the virtual object responsive to manipulation of the selection plane. It further relates to dynamically selecting an anchor point for the hand proximate to a grasp point of two or more of the calculation points of the hand, assigning a strength attribute to the anchor point based on a degree of convergence to the dynamically selected anchor points, and manipulating the virtual object responsive to the anchor point strength attribute when the anchor point and the manipulation point are within a predetermined range of each other. In some embodiments, the grasp point of a pinch gesture includes convergence of at least two opposable finger or thumb contact points. In other embodiments, the grasp point of a grab gesture includes convergence of a palm contact point with at least one opposable finger contact points.

The technology disclosed also relates to simplifying manipulation of a virtual object using detected hand motions that operate a virtual tool. In another embodiment, a detected hand includes calculation points of potential interaction with a manipulation point of the virtual tool. In particular, detecting finger motion of the hand and positions of calculation points of fingers of the hand relative to the virtual tool used to manipulate the virtual object, manipulating the virtual tool by interaction between the detected finger motion and virtual manipulation points on an input side of the virtual tool, dynamically selecting at least one manipulation point proximate to the virtual object based on convergence of calculation points of the virtual tool, and manipulating the virtual object by interaction between contact points on an output side of the virtual tool and a virtual manipulation point on the virtual object.

In one embodiment, the virtual tool is a scissor and manipulating the virtual object further includes cutting the virtual object. In another embodiment, the virtual tool is a scalpel and manipulating the virtual object further includes slicing the virtual object.

The technology disclosed also relates to detecting opposable motion and positions of the calculation points of the fingers of the hand. The technology disclosed further relates to detecting opposable motion and positions of the calculation points of the fingers of the hand, detecting the manipulation point proximate to a point of convergence of the opposable calculation points, and assigning a strength attribute to the manipulation point based on a degree of convergence of the opposable calculation points.

In one embodiment, the dynamically selected manipulation point is selected from a predetermined list of available manipulation points for a particular form of the virtual object. In another embodiment, the dynamically selected manipulation point is created proximate to the virtual object based on the detected finger motion and positions of the calculation points. In yet another embodiment, the fingers and the virtual object both have anchor points and force applied by the calculation points through the manipulation point is calculated between a finger anchor point and a virtual object anchor point.

In some embodiments, the technology disclosed also includes generating data for augmented display representing a position of the virtual object relative to a direct view of the detected hand. In other embodiments, the technology disclosed further includes generating data for display representing positions in a rendered virtual space of the virtual object and the detected hand. In yet another embodiment, the technology disclosed relates to manipulating the virtual object responsive to a proximity between a virtual representation of the detected hand generated using the data for display and the manipulation point of the virtual object.

One embodiment includes detecting hand motion and positions of the calculation points relative to two or more virtual objects to be manipulated, dynamically selecting one or more manipulation points proximate to at least one of the virtual objects based on the detected hand motion and positions of one or more of the calculation points, and manipulating at least one of the virtual Objects by interaction between the detected hand motion and positions of one or more of the calculation points and the dynamically selected manipulation points.

One embodiment includes detecting hand motion and positions of calculation points relative to two or more virtual objects to be manipulated, manipulating a first virtual object by interaction between the detected hand motion and at least one virtual manipulation point of the first virtual object, dynamically selecting at least one manipulation point of a second virtual object responsive to convergence of calculation points of the first virtual object, and manipulating the second virtual object when the virtual manipulation point of the first virtual object and the virtual manipulation point of the second virtual object are within a predetermined range of each other.

In one embodiment, a method for finding a virtual object primitive is provided. The method can include receiving at least one primitive indicating a virtual concept. Determining from the primitive and sensory information about an environment a variation in a property of the at least one primitive indicating a result of a virtualized simulation based at least in part on the primitive and the sensory information can be included in the method. The method further includes providing the object primitive property.

In an embodiment, determining can comprise simulating the effect of a force.

In an embodiment, determining can comprise minimizing a cost function.

In an embodiment, determining can comprise: detecting a collision.

In an embodiment, determining can comprise recognizing an object property dependence (e.g., understanding how scale and orientation of primitive affects interaction.

In an embodiment, determining can comprise determining a meaning in context.

In one embodiment, determining a meaning in context can comprise performing eye tracking. Determining a meaning in context can comprise recognizing at least one parameter of the human voice in some embodiments. Determining a meaning in context can comprise vector or tensor mechanics.

In an embodiment, one or more manipulation points can be determined using a weighted average of distance from each calculation point to an anchor point.

In an embodiment, an anchor point can be determined based upon a type of interaction. In an embodiment, an anchor point can be determined based upon a locus of activity of an interaction.

Among other aspects, embodiments can enable improved control of machines or other computing resources based at least in part upon enhancing a virtual reality primitive or construct based upon sensed information indicating commands and/or other inputs. Embodiments can enable modeling of physical objects, created objects and interactions with combinations thereof for interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof).

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

FIGS. 7, 7-1, 7-2, 8, 8-1, 8-2, 8-3, and 8-4 illustrate an exemplary machine sensory and control system in embodiments.

BRIEF DESCRIPTION

Techniques described herein can be implemented as one or a combination of methods, systems or processor executed code to form embodiments capable of improved control of machines or other computing resources based at least in part upon enhancing a virtual reality primitive or construct based upon sensed information indicating commands and/or other inputs. Embodiments can enable modeling of physical objects, created objects and interactions with combinations thereof for machine control or other purposes.

Figure 1:
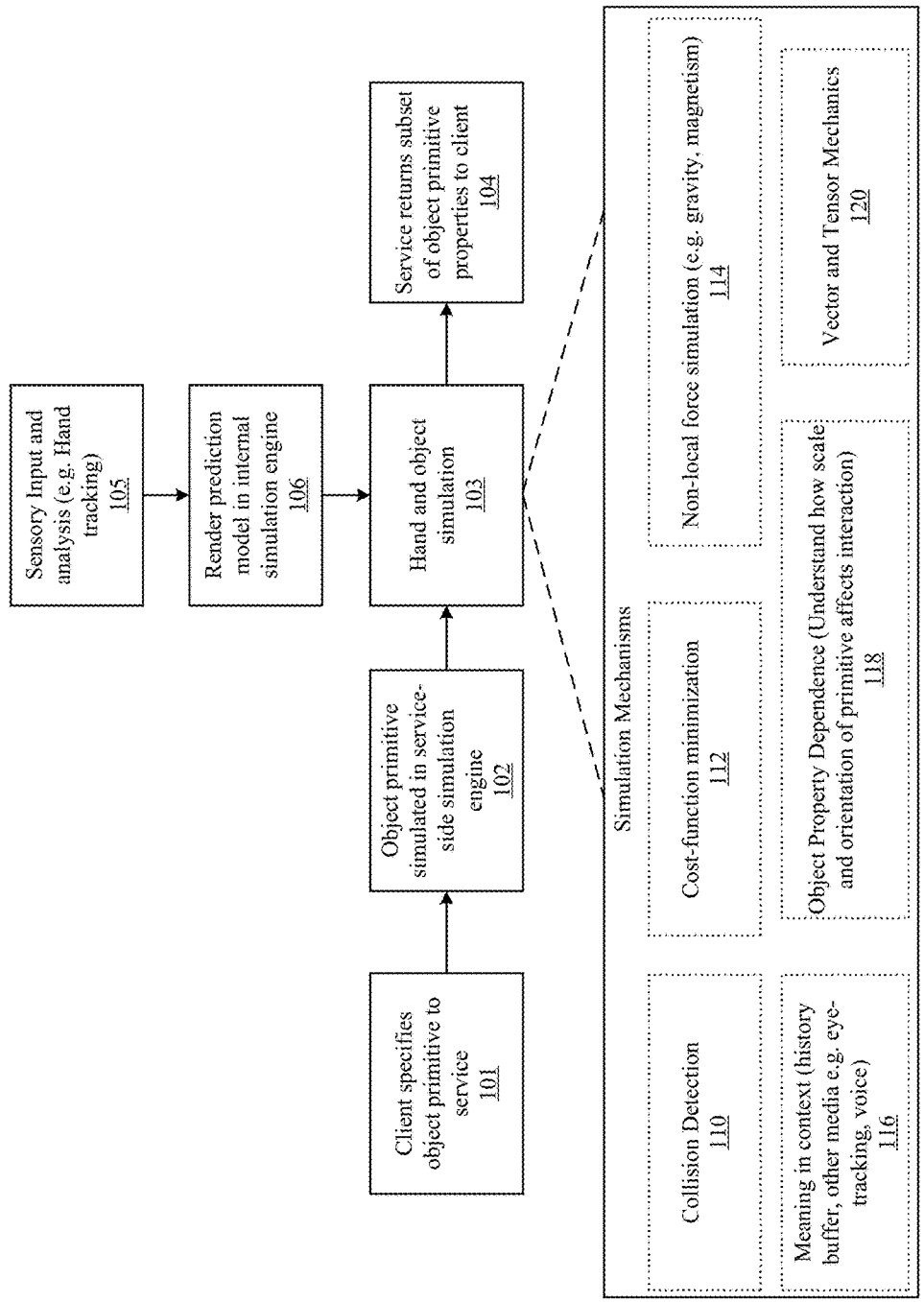
FIG. 1 illustrates a sensory augmentation system to add simulated sensory information to a virtual reality input.

FIG. 1 illustrates a sensory augmentation system to add simulated sensory information to a virtual reality input. The system is adapted to receive a virtual reality input including a primitive (101). Virtual reality primitives can include e.g., virtual character, virtual environment, others, or properties thereof. The primitive is simulated by a service side simulation engine (102). Information about a physical environment is sensed and analyzed (105). See also FIGS. 7 and 8. A predictive information (e.g., model, etc.) is rendered in an internal simulation engine (106). Predictive information and processes for rendering predictive models are described in further detail with reference to FIGS. 8-1, 8-2. Hands and/or other object types are simulated (103) based upon results of the object primitive simulation in the service side simulation engine and the results of the prediction information rendered in an internal simulation engine. (See also FIG. 8: 1971). In embodiments, various simulation mechanisms 110-120 are employed alone or in conjunction with one another as well as other existing/emerging simulation mechanisms and/or some combination thereof can be utilized in accordance with the requirements of a particular implementation. The service returns as a result a subset of object primitive properties to the client (104). Object primitive properties can be determined from the simulation mechanisms 110-120, the predictive information, or combinations thereof.

In an embodiment, a simulation mechanism comprises simulating the effect of a force (114). In an embodiment, a simulation mechanism comprises minimizing a cost function (112).

In an embodiment, a simulation mechanism comprises detecting a collision (110).

In an embodiment, a simulation mechanism comprises determining a meaning in context (116). Sometimes, determining a meaning in context further comprises eye tracking. In some applications determining a meaning in context further comprises recognizing at least one parameter of the human voice.

In an embodiment, a simulation mechanism comprises recognizing an object property dependence (e.g., understanding how scale and orientation of primitive affects interaction.

In an embodiment, a simulation mechanism comprises vector or tensor mechanics (120).

Figure 2:
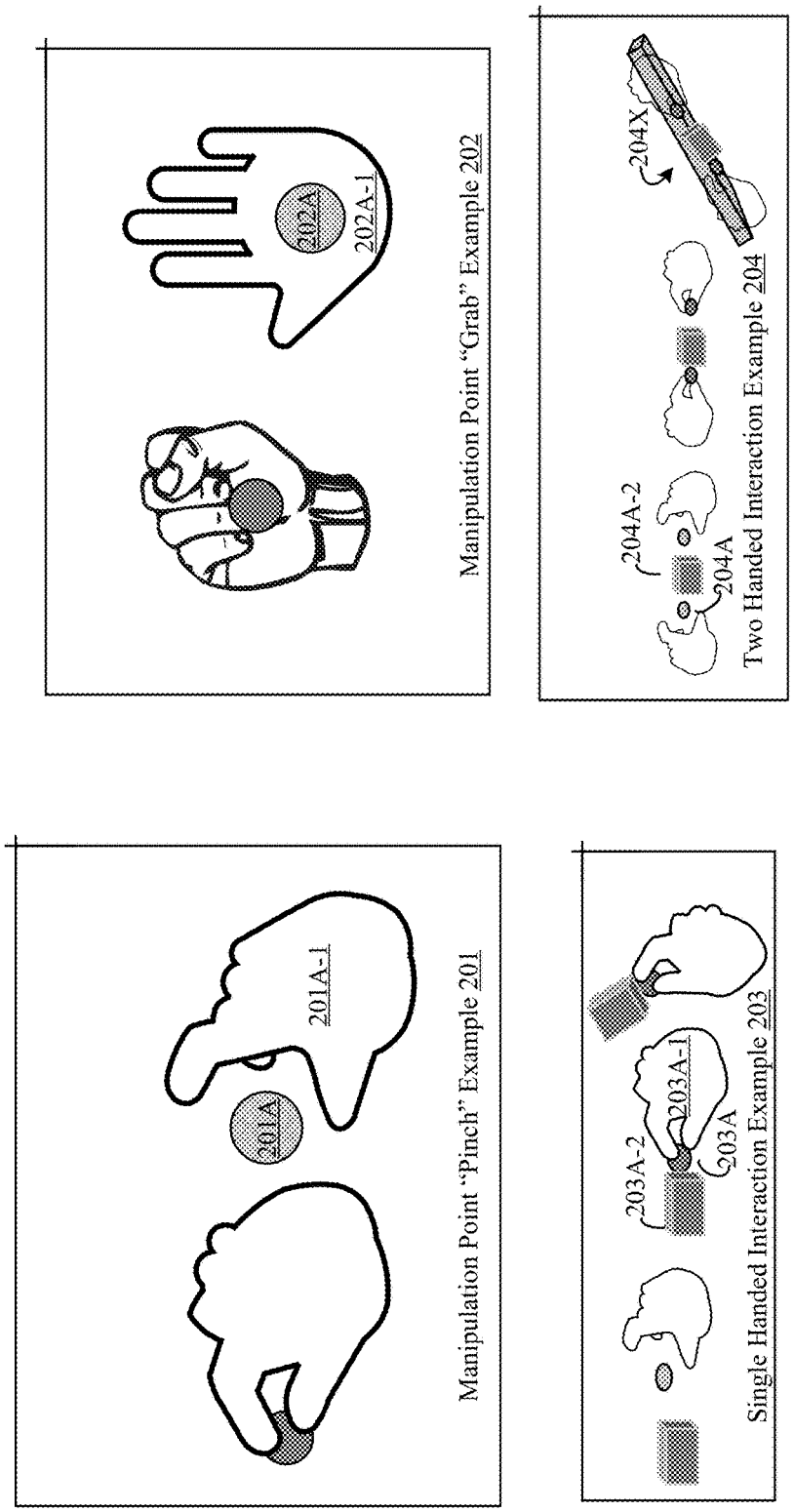
FIG. 2 illustrates a manipulation point example 201 depicting a process for determining a manipulation point 201A relative to a prediction model 201A-1 in an embodiment.

FIG. 2 illustrates a manipulation point example 201 depicting a process for determining a manipulation point 201A relative to a prediction model 201A-1 in an embodiment. A prediction model is a predicted virtual representation of at least a portion of physical data observed by a Motion Sensing Controller System (MSCS). In the embodiment illustrated by FIG. 2, the prediction model 201A-1 is a predicted virtual representation of at least a portion of a hand (i.e., a "virtual hand"), but could also include virtual representations of a face, a tool, or any combination thereof, for example as elaborated upon in commonly owned U.S. Provisional Patent Applications Nos. 61/871,790, 61/873, 758.

Manipulation point 201A comprises a location in virtual space; in embodiments this virtual space may be associated with a physical space for example as described in commonly owned U.S. patent application, entitled "VELOCITY FIELD INTERACTION FOR FREE SPACE GESTURE INTERFACE AND CONTROL" to Issac Cohen (Ser. No. 14/516,493). A manipulation point can comprise one or more quantities representing various attributes, such as for example a manipulation point "strength" attribute, which is indicated in FIG. 2 by the shading of manipulation point 201A.

A manipulation point can be used to describe an interaction in virtual space, properties and/or attributes thereof, as well as combinations thereof. In example 201, a manipulation point 201A represents a location of a "pinch" gesture in virtual space; the shading of the point as depicted by FIG. 2 indicates a relative strength of the manipulation point.

Now with reference to a manipulation point example 202, a manipulation point 202A comprises a strength and a location of a "grab" gesture 202A-1. Gestures can "occur" in physical space, virtual space and/or combinations thereof.

In embodiments, manipulation points, or attributes thereof, can be used to describe interactions with objects in virtual space. In single handed manipulation example 203 a virtual hand 203A-1 starts with a weak "pinch" manipulation point between the thumb and the index finger. The virtual hand 203A-1 approaches a virtual object 203A-2, and the thumb and index finger are brought closer together; this proximity may increase the strength of the manipulation point 203A. In embodiments, if the strength of the manipulation point exceeds a threshold and/or the manipulation point is in sufficient proximity to a virtual object, the virtual object can he "selected". Selection can comprise a virtual action (e.g., virtual grab, virtual pinch, virtual swat and so forth) relative to the virtual object that represents a physical action that can be made relative to a physical object; however it is not necessary for the physical action nor the physical object to actually exist. Virtual actions can result in virtual results (e.g., a virtual pinch can result in a virtual deformation or a virtual swat can result in a virtual translation). Thresholding (or other quantitative techniques) can be used to describe the extent of a virtual action yielding a virtual result depending on an object type and other properties of the scene. For example, a virtual rubber object can be virtually pinched according to a different threshold indicating virtual deformation of a surface of the virtual rubber object than a threshold indicating deformation of a virtual steel object.

As illustrated in single handed interaction example 203 once a manipulation point selects a virtual object, the virtual object can be rotated, translated, scaled, and otherwise manipulated. If the thumb and index finger of the virtual hand become separated, the strength of the manipulation point may decrease, and the object may be disengaged from the prediction model.

A two handed interaction example 204 illustrates a two-handed manipulation of a virtual object 204A-2 facilitated by a plurality of manipulation points 204A. The manipulation point 204A need not intersect the virtual object 204A-2 to select it. In an embodiment, a plurality of manipulation points may engage with one another and "lock" on as if one or more of the plurality was itself a virtual object. In an embodiment, two or more manipulation points may lock if they both exceed a threshold strength; this may define a "selection plane" 204X (or vector, or other mathematical construct defining a relationship) as illustrated in 204.

Figure 3:
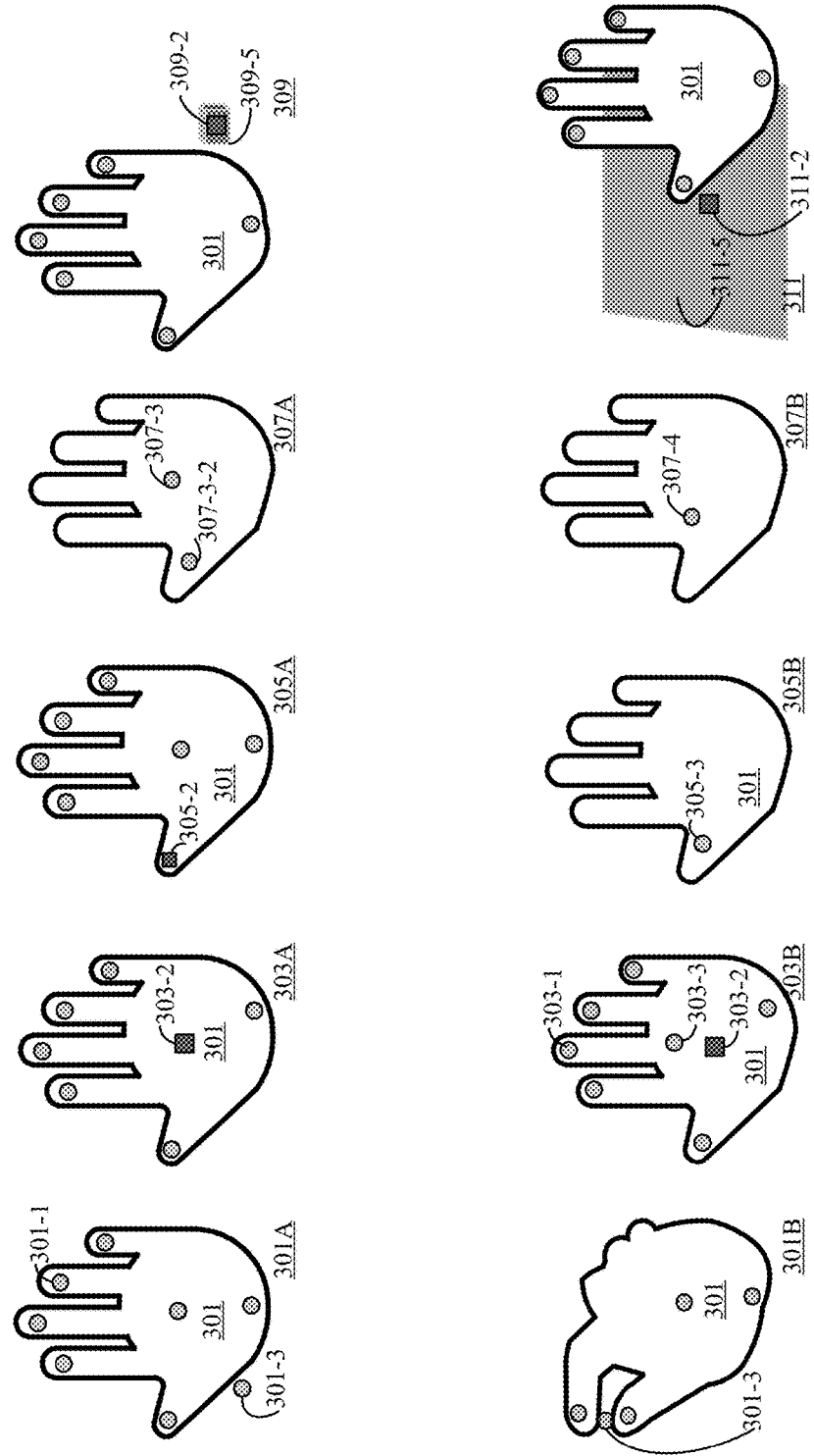
FIG. 3 illustrates determining parameters of a manipulation point based on the structure, scale, orientation, density, or other object, properties of portions of a prediction model in an embodiment.

FIG. 3 illustrates determining parameters of a manipulation point based on the structure, scale, orientation, density, or other object properties of portions of a prediction model in an embodiment. In example 301A, a collection of "calculation points" 301-1 in proximity to a virtual hand 301 can be input into a "manipulation point determination method" to determine at least a portion of at least one parameter of a manipulation point 301-3. One example manipulation point determination method is determining a weighted average of distance from each calculation point to an anchor point. Calculation point(s) can evolve through space, however, as shown with reference to example 301B in comparison to example 301A. In example 301B underlying prediction model 301 has changed from previous configuration of prediction model 301 in Example 301A, and the manipulation point 301-3 is determined to be at a different location based at least in part on the evolution of model 301.

Now with reference to example 303A, an "anchor point" 303-2 can be defined as a calculation point and can serve as an input into the manipulation point determination method. For example, an anchor point can be selected according to a type of interaction and/or a location of where the interaction is to occur (i.e., a center of activity) (e.g., a pinch gesture indicates an anchor point between the thumb and index finger, a thrumming of fingertips on a desk indicates an anchor point located at the desk where the wrist is in contact). As shown with reference to example 303B in comparison to example 303A, a manipulation point 303-3 can be determined based at least in part upon the one or more calculation points 303-1 and the anchor point 303-2. For example, the location is determined in one embodiment using a weighted average of the locations of the calculation points with respect to the location of the anchor point. The strength of the manipulation point 303-3 can be determined in a variety of ways, such as for example according to a location of the calculation point determined to be "farthest" away from manipulation point 303-3. Alternatively, the strength could be determined according to a weighting of different distances of calculation points from the manipulation point 303-3. Other techniques can be used in various other embodiments.

In embodiments, the manipulation point(s) can be used to facilitate interactions in virtual space as described above with reference to FIG. 2. By moving an anchor point around relative to a predictive model, a resulting manipulation point can be in various locations. For example, with reference to example 305A, an anchor point 305-2 may be defined in a different location on the prediction model 301 in example 303A (as compared with anchor point 303-2 of model 301). In embodiments, the location of an anchor point can influence the type of manipulation point calculated. Now with reference to example 303B, the anchor point 303-3 could be used to define a "grab" point, while the configuration of example 305B yields a manipulation point 305-3 that can be used to define a pinch point. In embodiments, more than one anchor point can be used. In an embodiment, anchor and points and/or manipulation points can be treated as types of calculation points.

An anchor point 307-3 in example 307A can itself serve as a calculation point, thereby enabling determining a further refined manipulation point 307-4 as shown by example 307B. In an embodiment, a weighted average of the location and strength of a plurality of manipulation points 307-3, 307-3-2 in example 307 can be used to define a "general manipulation point" 307-4 in example 307B.

In embodiments, anchor or calculation points can be placed on objects external to the prediction model as illustrated with reference to example 309. As shown by example 309, an object 309-5, separate from predictive model 301 includes an anchor point 309-2. Object(s) 309-5 can be purely virtual constructs, or virtual constructs based at least on part on prediction models of physical objects as described above. In an embodiment illustrated with reference to example 311, such object is a "virtual surface" 311-5. Complex interactions can be enabled by determining the manipulation point of a prediction model 301 with respect to at least one anchor point 311-2 defined on virtual surface 311-5. In embodiments, such virtual surface can correspond to a desk, kitchen countertop, lab table or other work surface(s) in physical space. Association of anchor point 311-2 with virtual surface 311-5 can enable modeling of a user interaction "anchored" to a physical surface, e.g., a user's hand resting on a flat surface while typing while interacting meaningfully with the virtual space.

Figure 4:
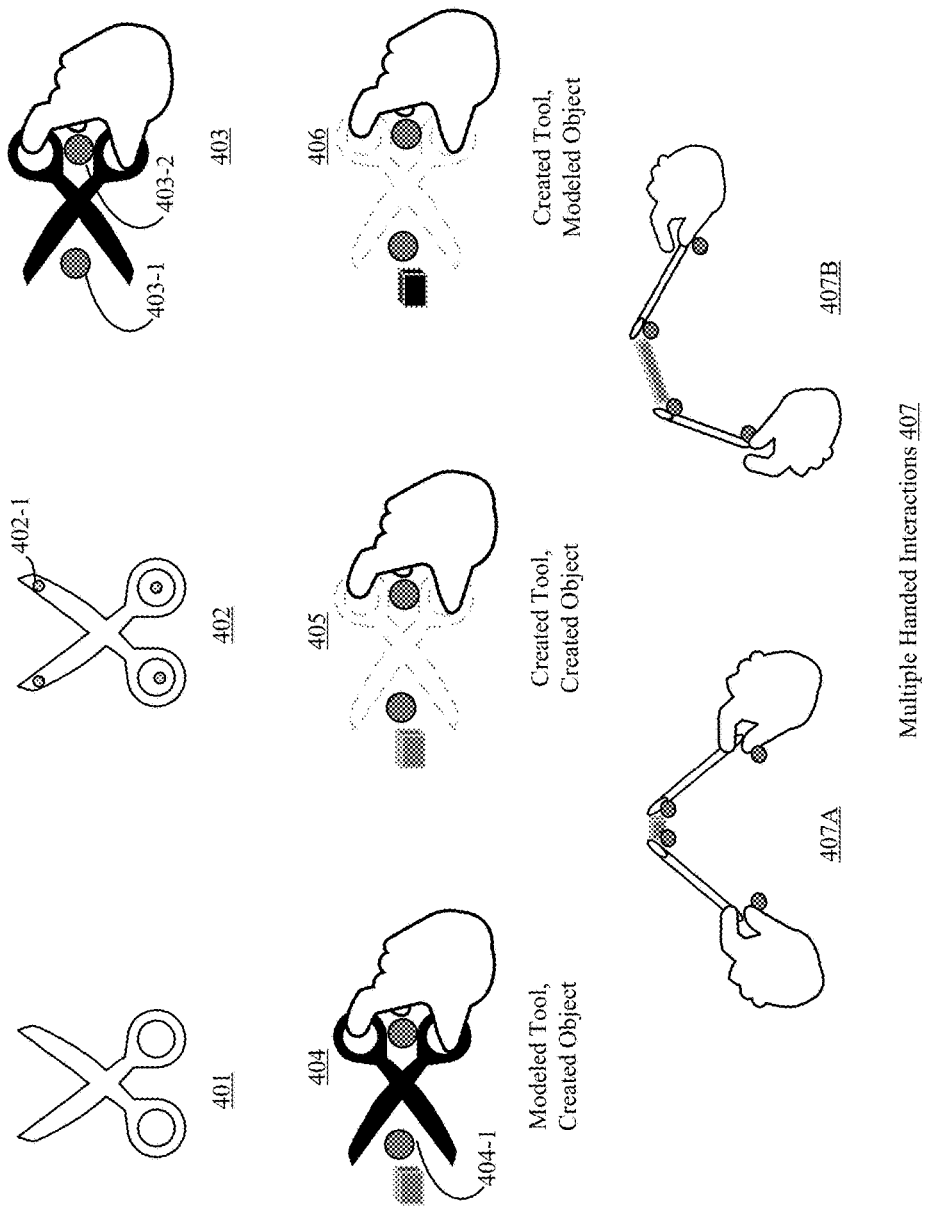
FIG. 4 illustrates a representative prediction models according to embodiments.

FIG. 4 illustrates a representative prediction models according to embodiments. A prediction model may also model a tool as illustrated by example 401. Calculation points can be defined as illustrated by example 402. As shown in example 402, a pair of scissors (could be a scalpel, stethoscope, sigmoid scope, dentistry implement, hammer, screwdriver, golf club, (chain)saw, or any other type of tool) may have one or more calculation points 402-1 defined in relation to it. For example, calculation points 402-1 can be defined relative to the tips of the blades of a pair of scissors andior at the base hoops as illustrated by example 402.

A prediction model can be based upon an observed object in physical space, e.g., a real hand using a real pair of scissors). Any component of the prediction model could be, however entirely or partially created without reference to any particular object in physical space.

For example, a hand holding a tool may be interpreted by a system as a prediction model of a hand whose manipulation point 403-2 is engaging a prediction model of a scissors; the scissors model may itself have one or more manipulation points 403-1 which can be distinct from the one or more manipulation points 403-2 of the hand as illustrated by example 403.

In embodiments, various configurations of modeled physical objects and created objects can be represented as predictive models. For example, to enable users to use modeled tools to manipulate created objects as illustrated by example 404. In example 404, the harder the user "squeezes" the modeled tool, the higher the strength of the tool's manipulation point 404-1 (e.g., the strength indicates more or less vigorous cutting of the created object by the action of the user). In example 405, a created tool is used in conjunction with a created object. In yet further example 406, a created tool manipulates a modeled object, For example a physical CPR dummy modeled can be "operated upon" virtually by a surgeon using created tools in a mixed physical-virtual environment. More than one hand using one or more tools is illustrated by examples 407. In example 407A two hands are gripping two tools that are brought in proximity to a created object. In 407B, further interactions are illustrated, including for example the user is enabled to simultaneously stretch and rotate the created object.

Figure 5:
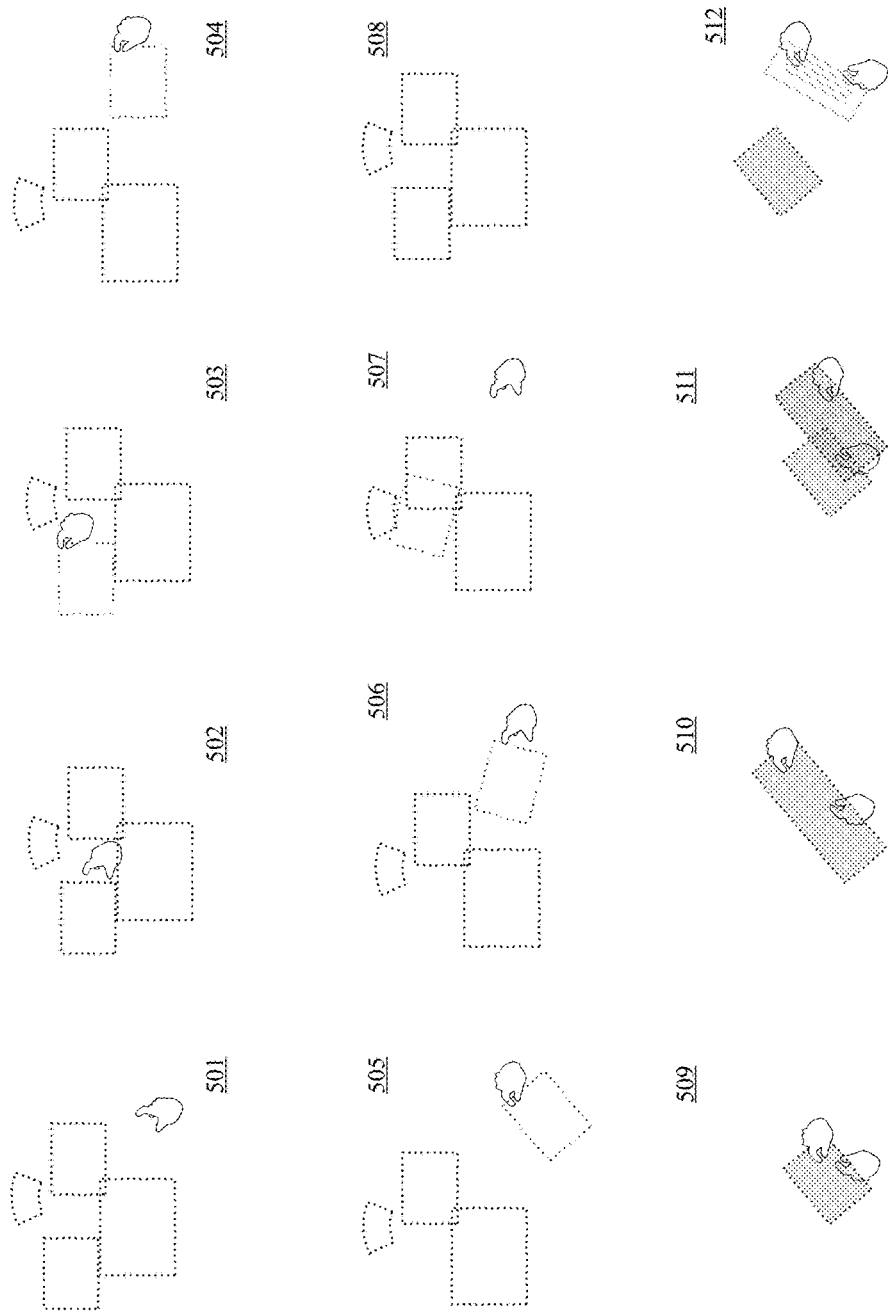
FIG. 5 illustrates manipulating virtual objects according to an embodiment.

FIG. 5 illustrates manipulating virtual objects according to an embodiment. As illustrated by example 501, a virtual object can be defined in virtual space as an object manipulable in space and capable of being presented to a user. For example, a user might employ a virtual reality headset (HMD) or other mechanism(s) that project(s) images associated with virtual objects into space; in other applications the virtual objects may be holographic or other types of projections in space. In embodiments virtual objects can be visible virtual objects or non-visible virtual objects. Visible virtual objects can be a screen, image, 3D image, or combinations thereof. Non-visible virtual objects can be haptic, audio, 3D audio, combinations thereof. Virtual objects comprise associated data that can be a portion of text, a button, an icon, a data point or points, or some other data. The system can render the data associated with a virtual object as a visible object (e.g., display the text), a non-visible object (e.g., read the text aloud) or a combination thereof.

As illustrated by example 501, a user may reach in space and come into proximity with one or more virtual objects as illustrated by example 502. Using manipulation points or another technique a user can select a virtual object as illustrated by example 503. A user can drag the virtual object as illustrated by example 504 and manipulate it in preparation for use as illustrated by example 505. When the user is done with the virtual object, they may use one of a variety of techniques to return the virtual object to its initial position or to a different position. Example 506 illustrates an embodiment in which the user is able to throw the virtual object, and the virtual object's trajectory and placement are determined at least in part by a system simulating the physics behind a hypothetical trajectory as illustrated by example 507 (object in transit) and example 508 (object at a final resting point).

Embodiments permit the use of two-handed manipulations of virtual objects. As illustrated by example 509, a user may hold a virtual object in place with one hand while manipulating the object with the other hand. Users can stretch, shrink, contort and otherwise transform virtual objects in the same ways as the virtual object manipulations described above as illustrated by example 510. In embodiments, a virtual construct (i.e., plane) can be defined in proximity to the virtual object to enable engagements with the object as illustrated by example 511. One use of such virtual constructs is further described in commonly owned U.S. patent applications Ser. Nos. 14/154,730, 14/280,018, and 14/155,722. In an embodiment, real and/or virtual objects can be used in conjunction with a manipulated Object. For example a real or virtual keyboard can be used with a virtual screen as illustrated by example 512.

Figure 6:
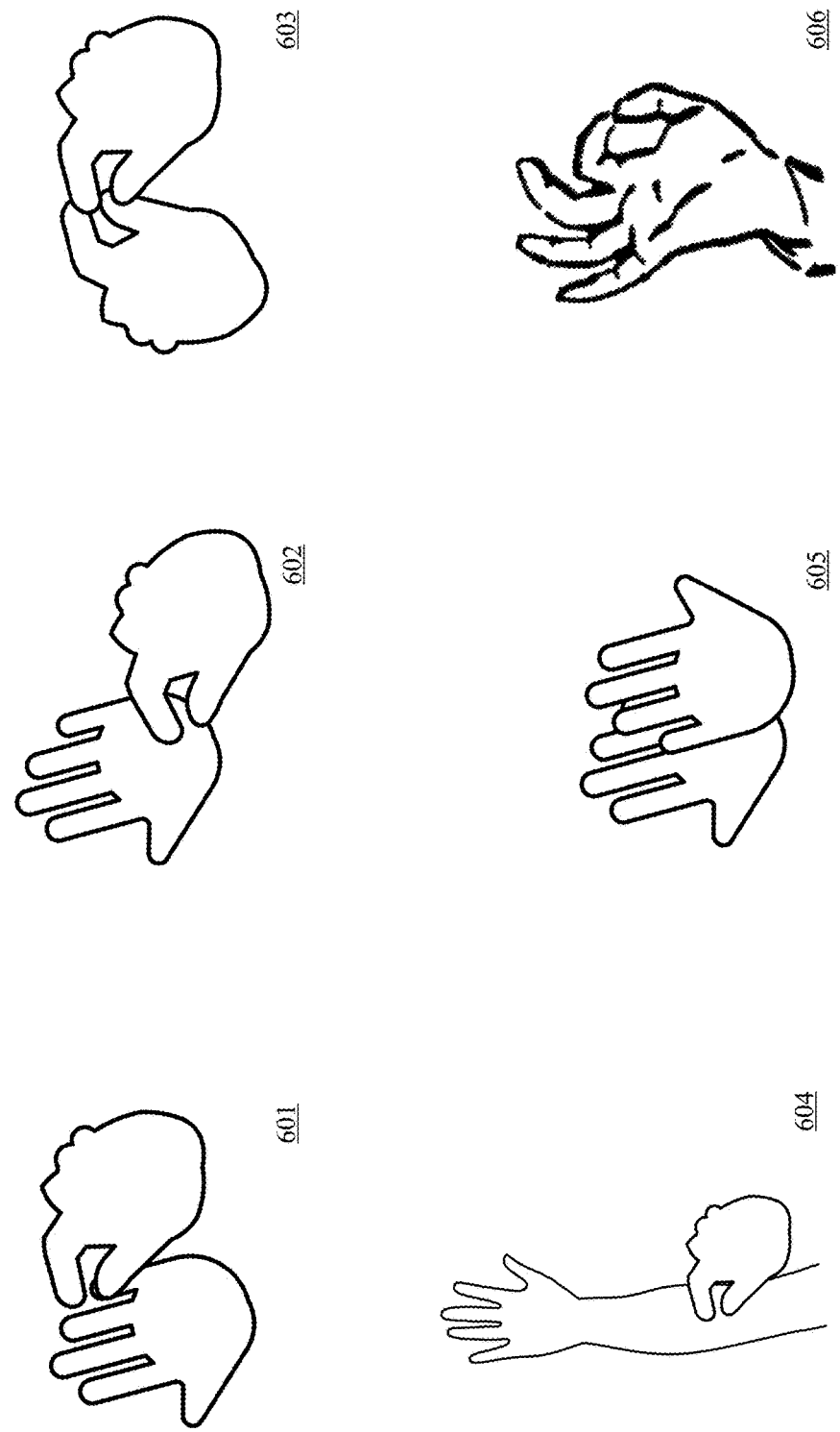
FIG. 6 illustrates self-interacting hands according to an embodiment.

FIG. 6 illustrates self-interacting hands according to an embodiment. Using the manipulation points described above or other techniques, sophisticated user interactions can be defined in virtual spaces. In one embodiment, a virtual space can be configured to detect the pinching of a portion of one hand by another as illustrated by example 601. The tapping of one hand against the portion of another can also be detected as illustrated by example 602. The system can detect pinching or pressing of one hand portion against another hand portion as illustrated by example 603. As illustrated by example 604, detection can extend to the manipulation of a user's limb portion by a hand. In embodiments the proximity of two hands can be detected as illustrated by example 605. The self-interaction of a hand can also be detected, for example finger pinching or flicking gestures as illustrated by example 606. The detection of such gestures can permit semi-haptic virtual interactions, such as the flicking of an enemy in a video game, or the closing of a screen in a user interface. In embodiments, virtual data may overlay a prediction model in real or virtual space; for example, holographic data may be projected on the arm depicted in example 604, and self-interactions with the data registered by the system and meaningfully processed.

Figure 7:
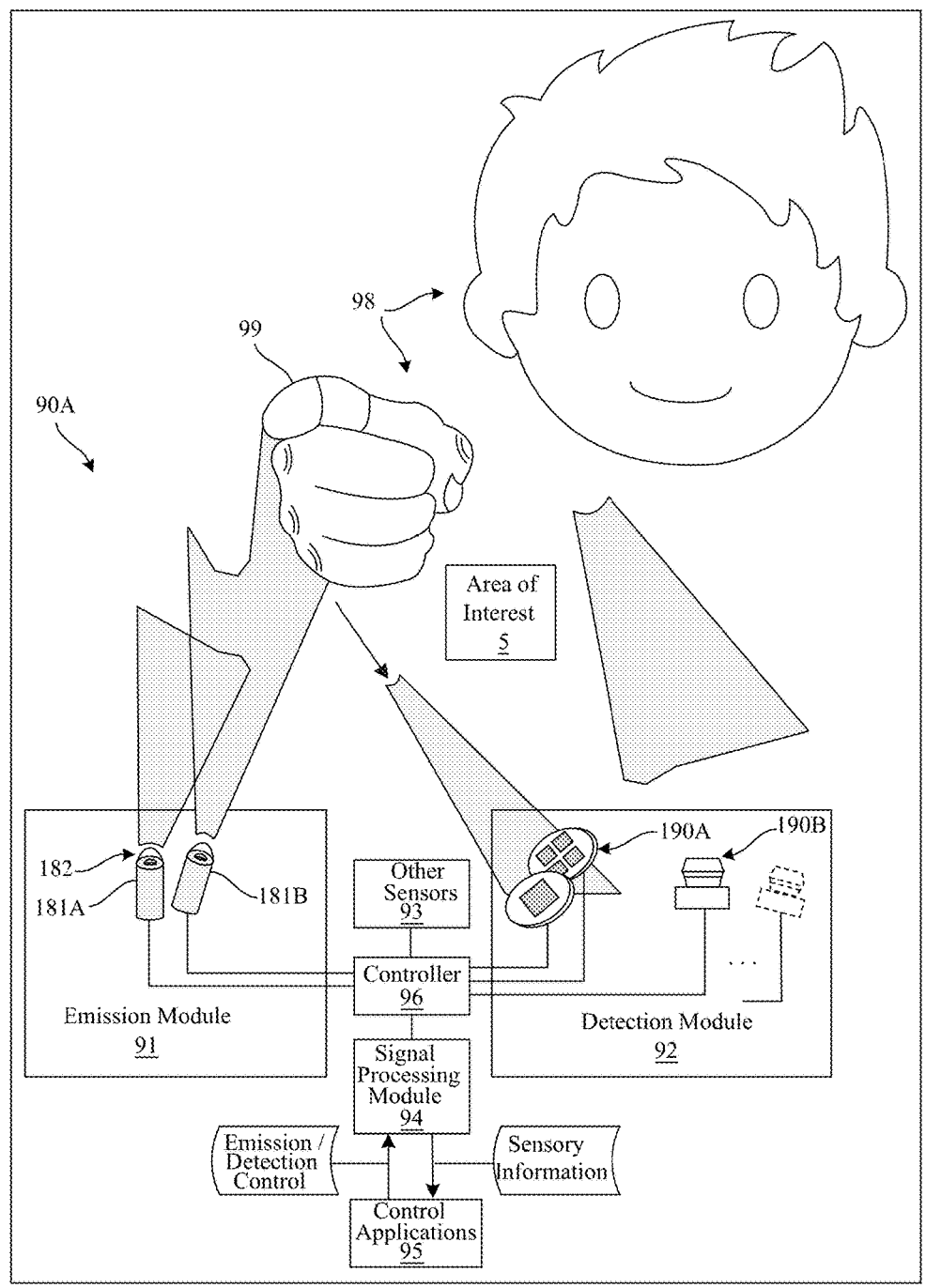
Figures 1, 7:
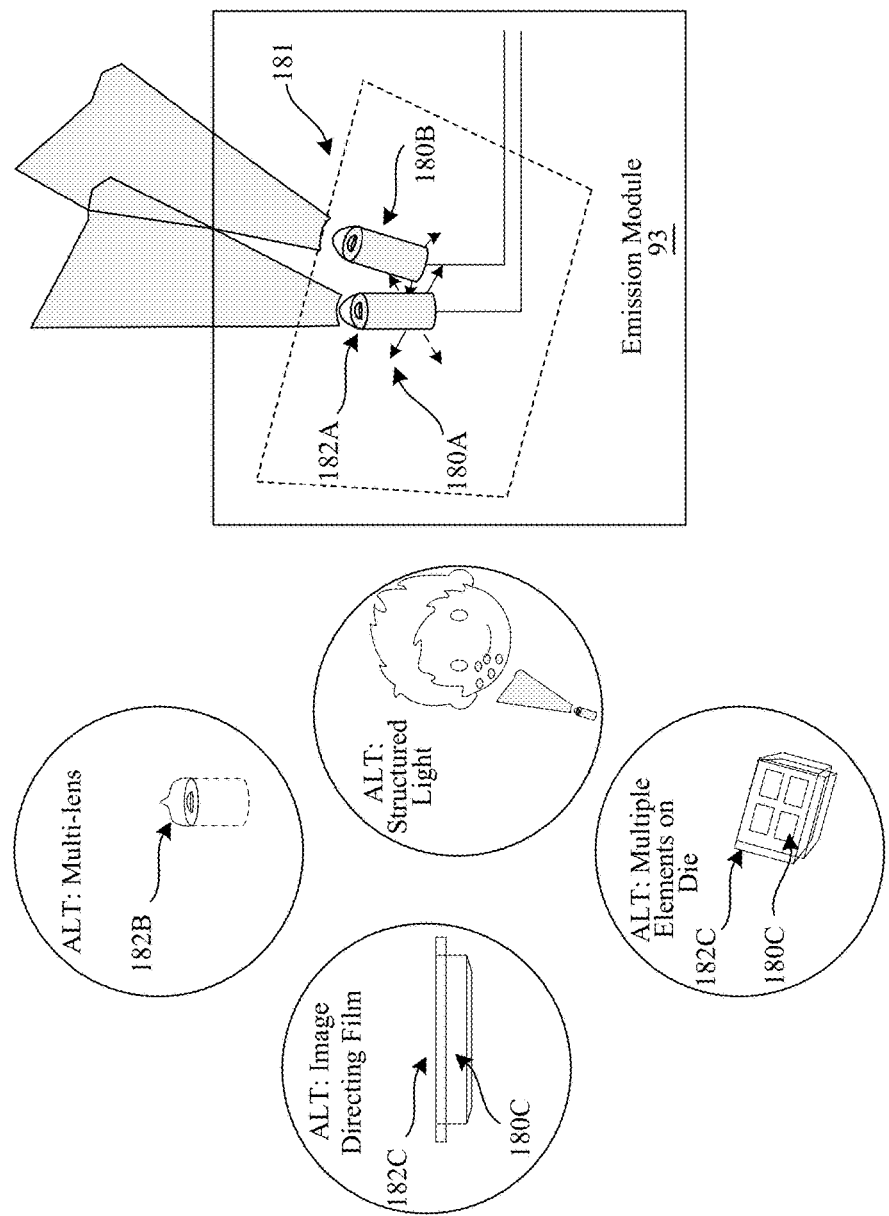
Figures 2, 7:
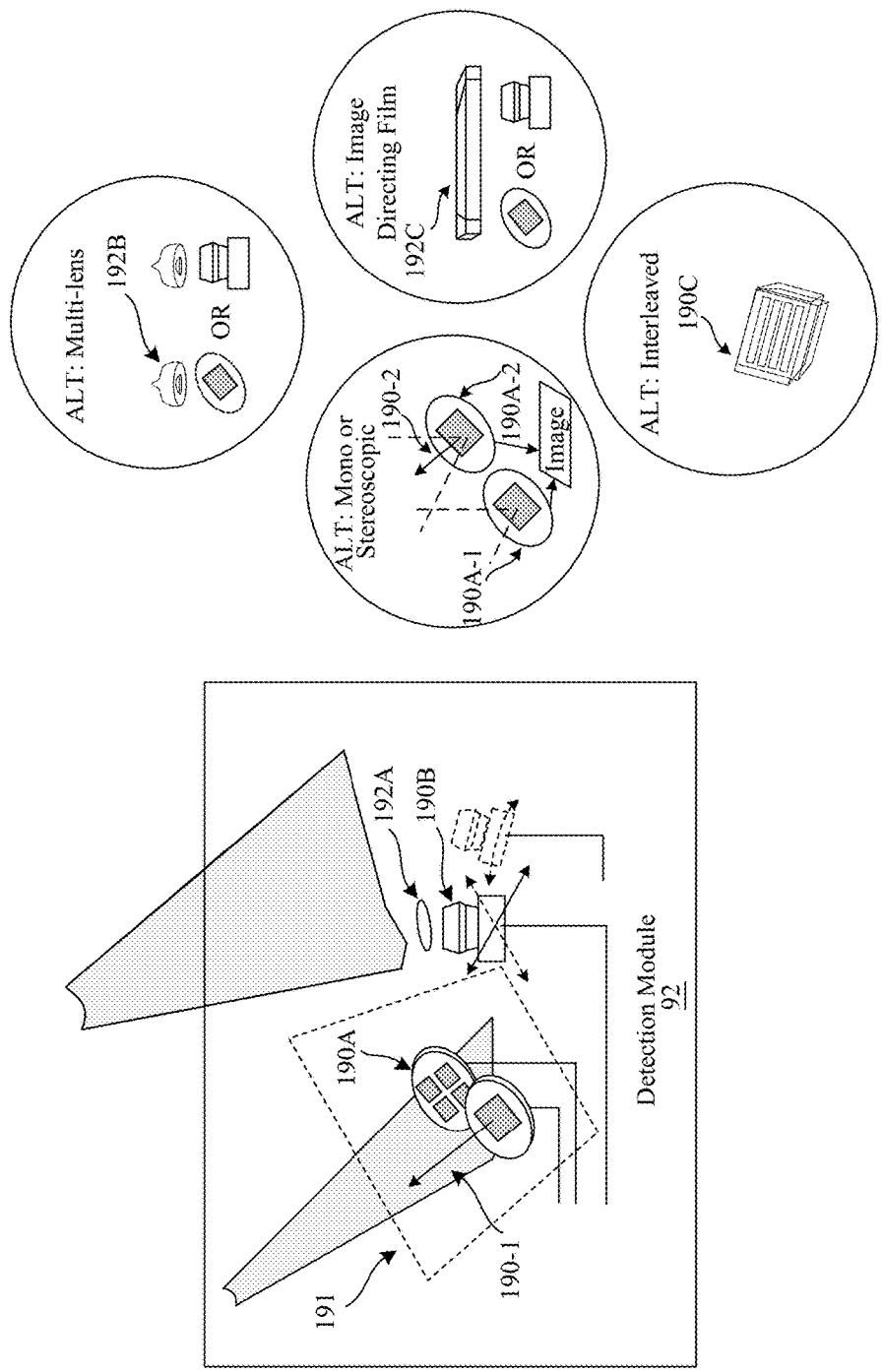
Figure 8:
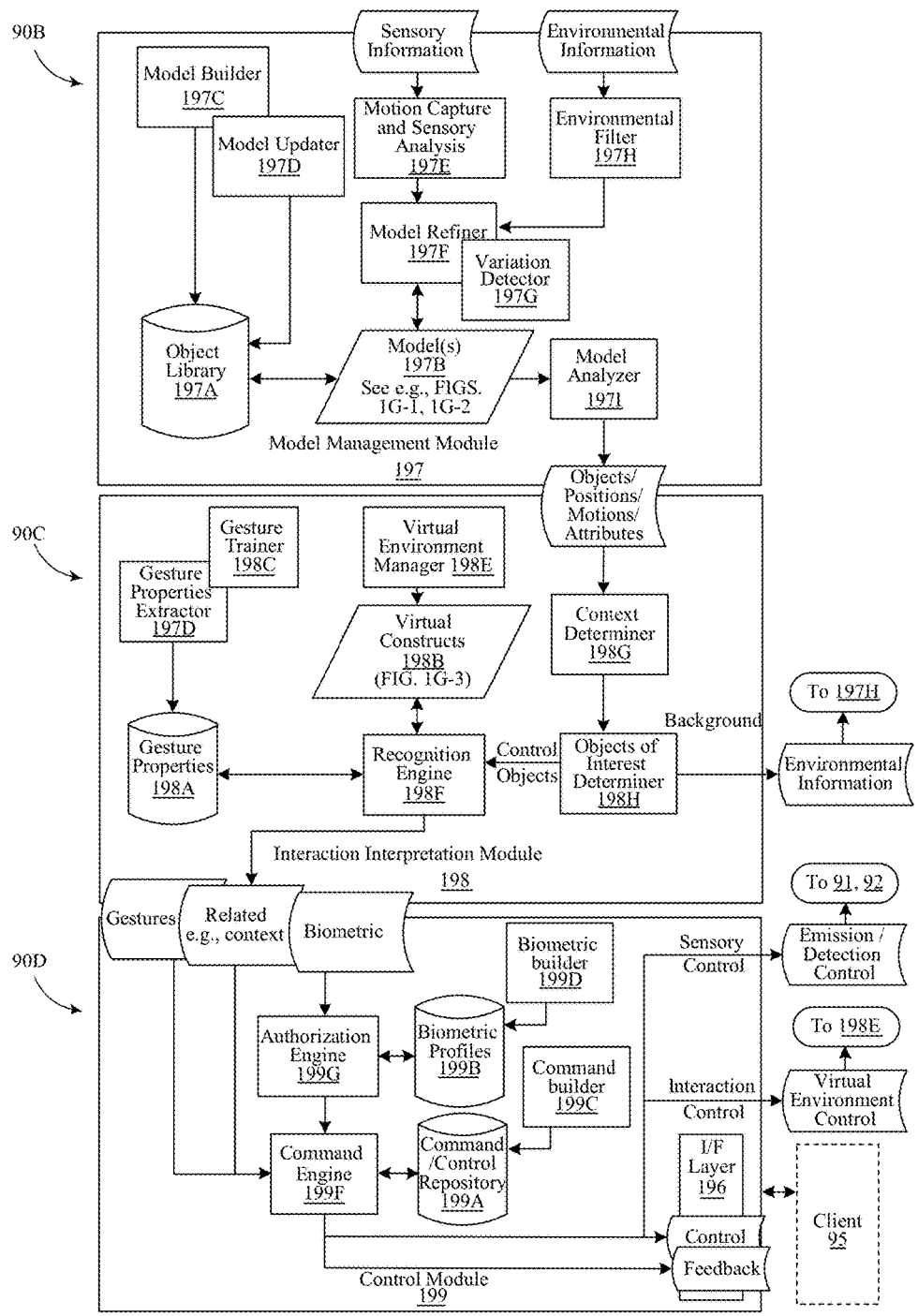
Figures 1, 8:
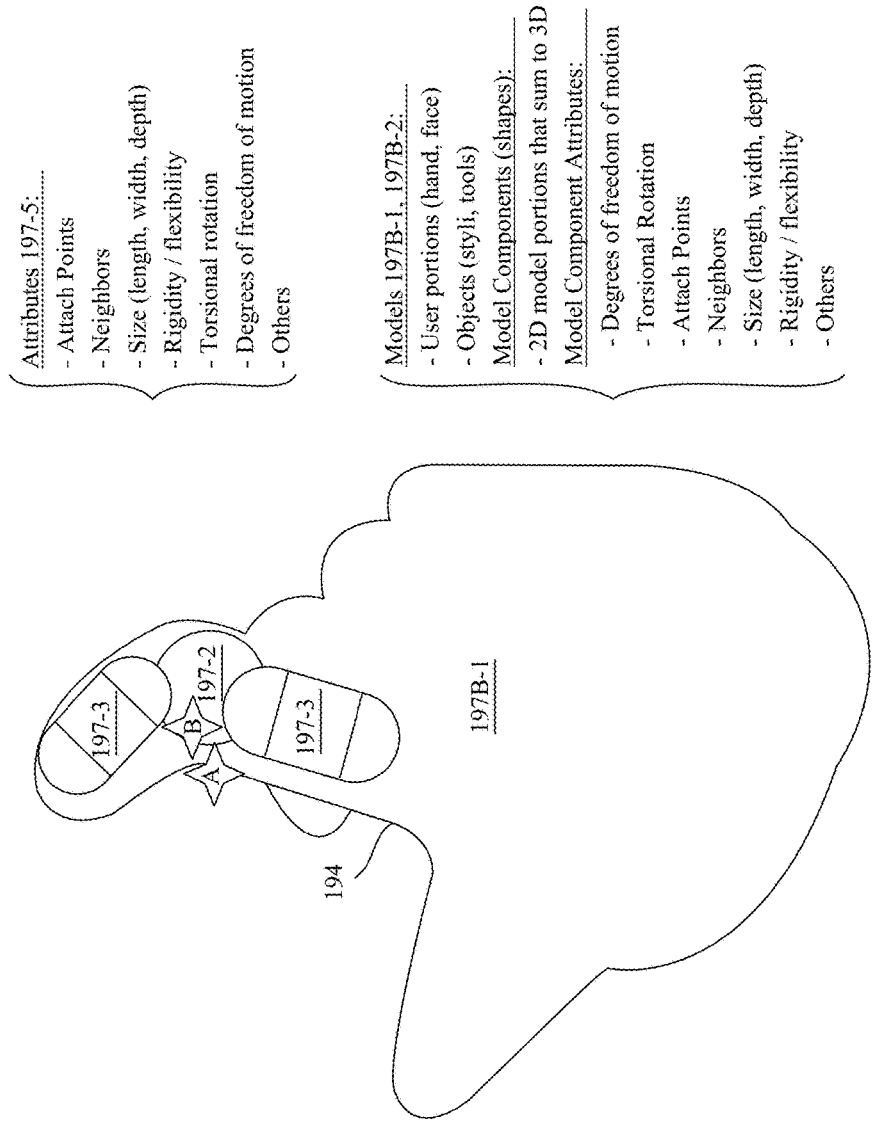
Figures 3, 8:
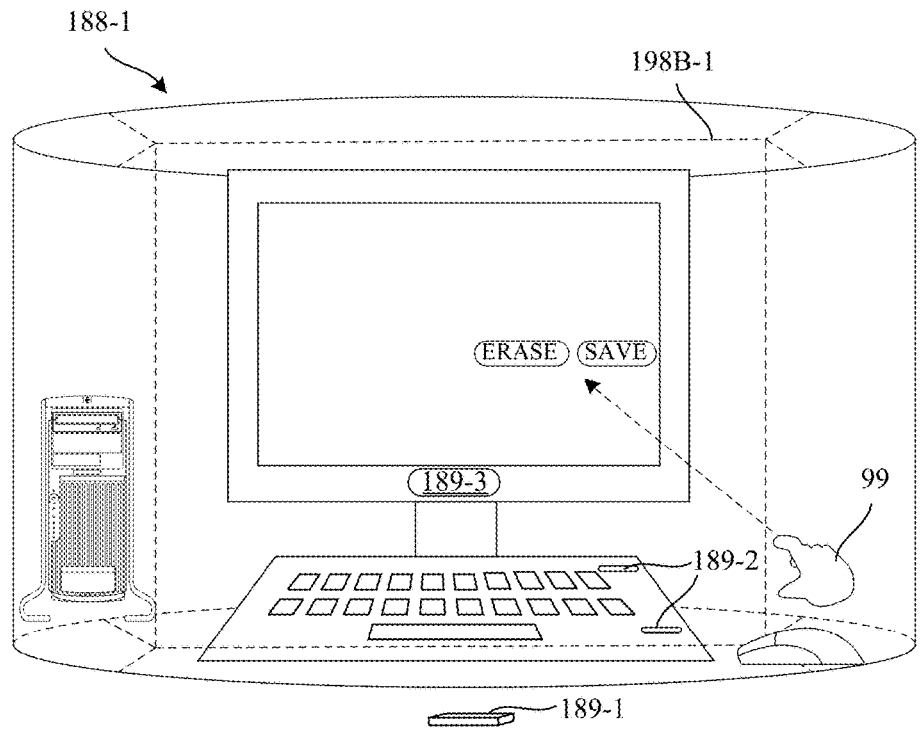
Figures 4, 8:
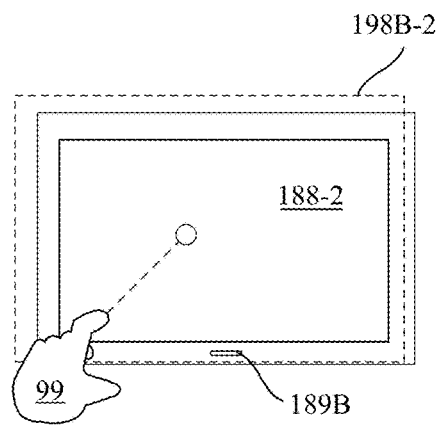

FIGS. 7-8 illustrate an exemplary machine sensory and control system (MSCS) in embodiments.

In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

As FIG. 7 shows, one detection system 90A embodiment includes an emission module 91, a detection module 92, a controller 96, a processing module 94 and a machine control module 95. In one embodiment, the emission module includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 8-1), image directing film (IDF) 182C (of FIG. 7-1), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 7-1) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 7-2) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 7-2) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190E can be coupled with devices 192 (and/or materials) (of FIG. 7-2) (e.g., lenses 192A (of FIG. 7-2), multi-lenses 192B (of FIG. 7-2), image directing film (IDF) 192C (of FIG. 7-2), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof; or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 7-2), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor-perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

For example and with reference to FIG. 8, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 8-1, 8-2)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1 197B-2 of FIGS. 8-1 8-2), useful to define and update models 197B, and model attributes 197-5. While illustrated with reference to a particular embodiment in which models, model components and attributes are co-located within a common object library 197A, it should be understood that these objects will be maintained separately in some embodiments.

FIG. 8-1 illustrates prediction information including a model 197B-1 of a control object (e.g., FIG. 7: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 8-1 for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

In an embodiment and with reference to FIGS. 7, 8-2, updating predictive information to observed information comprises selecting one or more sets of points (e.g., FIG. 8-2: 193A, 193B) in space surrounding or bounding the control object within a field of view of one or more image capture device(s). As shown by FIG. 8-2, points 193 can be determined using one or more sets of lines 195A, 195B, 195C, and 195D originating at vantage point(s) (e.g., FIG. 7: 190-1, 190-2) associated with the image capture device(s) (e.g., FIG. 7: 190A-1, 190A-2) and determining therefrom one or more intersection point(s) defining a bounding region (i.e., region formed by lines FIG. 8-2: 195A, 195B, 195C, and 195D) surrounding a cross-section of the control object. The bounding region can be used to define a virtual surface (FIG. 8-2: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example and according to one embodiment illustrated by FIG. 8-2, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and θ the rotation angle. The coefficients $C_1$, $C_2$ and $C_3$ are defined in terms of these parameters, as shown:

$$C_1 x^2 + C_2 xy + C_3 y^2 - (2C_1 x_c + C_2 y_c)x - \qquad (1)$$
$$(2C_3 y_c + C_2 x_c)y + (C_1 x_c^2 + C_2 x_c y_c + C_3 y_c^2 - 1) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for θ, subject to the constraints that: (1) $(x_C, y_C)$ must lie on the centerline determined from the four tangents 195A, 195B, 195C, and 195D (i.e., centerline 189A of FIGS. 8-2); and (2) a is fixed at the assumed value $a_0$. The ellipse equation can either be solved for θ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$
$$A_2 x + B_2 y + D_2 = 0$$
$$A_3 x + B_3 y + D_3 = 0 \qquad (2)$$
$$A_4 x + B_4 y + D_4 = 0$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \qquad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1 = (r_{13} + r_{24})/2$$
$$c2 = (r_{14} + r_{23})/2$$
$$\delta 1 = c2_1 - c1_1$$
$$\delta 2 = c2_2 - c1_2$$
$$p = \delta 1/\delta 2 \qquad (4)$$
$$q = c1_1 - c1_2 * p$$
$$G = Ap + B$$
$$H = Aq + D$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix} \qquad (5)$$

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1 A_1)^2 + (v_2 A_2)^2 + (v_3 A_3)^2$$
$$v_{AB} = (v_1 A_1 B_1)^2 + (v_2 A_2 B_2)^2 + (v_3 A_3 B_3)^2$$
$$v_{B2} = (v_1 B_1)^2 + (v_2 B_2)^2 + (v_3 B_3)^2$$

-continued $$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2 \qquad 5$$

Using the parameters defined in equations (1)-(5), solving for θ is accomplished by solving the eighth-degree polynomial equation (6) for t, where the coefficients $Q_i$ (for i=0 to 8) are defined as shown in equations (7)-(15).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \qquad (6)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of θ are defined as θ=a tan(t).

$$Q_8 = 4A_1^2 n^2 v_{B2}^2 + 4 v_{B2} B_1^2 (1 - n^2 v_{A2}) - (G_1 (1 - n^2 v_{A2}) w_{B2} + n^2 v_{B2} w_{A2} + 2 H_1 v_{B2})^2 \qquad (7)$$

$$Q_7 = -(2(2n^2 v_{AB} w_{A2} + 4H_1 v_{AB} + 2G_1 n^2 v_{AB} w_{B2} + 2\,G_1(1 - n^2 v_{A2}) w_{AB}))(G_1(1 - n^2 v_{A2}) w_{B2} + n^2 v_{B2} w_{A2} + 2H_1 v_{B2}) - 8A_1 B_1 n^2 v_{B2}^2 + 16 A_1^2 n^2 v_{AB} v_{B2} + (4(2 A_1 B_1 (1 - n^2 v_{A2}) + 2 B_1^2 n^2 v_{AB})) v_{B2} + 8 B_1^2 (1 - n^2 v_{A2}) v_{AB} \qquad (8)$$

$$Q_6 = -(2(2H_1 v_{B2} + 2H_1 v_{A2} + n^2 v_{A2} w_{A2} + n^2 v_{B2}(-2 w_{AB} + w_{B2}) + G_1(n^2 v_{A2} + 1) w_{B2} + 4 G_1 n^2 v_{AB} w_{AB} + G_1(1 - n^2 v_{A2}) v_{A2}) \times (G_1(1 - n^2 v_{A2}) w_{B2} + n^2 v_{B2} w_{A2} + 2 H_1 v_{B2}) - (2 n^2 v_{AB} w_{A2} + 4 H_1 v_{AB} + 2 G_1 n^2 v_{AB} w_{B2} + 2 G_1(1 - n^2 v_{A2}) w_{AB})^2 + 4 B_1^2 n^2 v_{B2}^2 - 32 A_1 B_1 n^2 v_{AB} v_{B2} + 4 A_1^2 n^2 (2 v_{A2} v_{B2} + 4 v_{AB}^2) + 4 A_1^2 n^2 v_{B2}^2 + (4(A_1^2(1 - n^2 v_{A2}) + 4 A_1 B_1 n^2 v_{AB} + B_1^2(-n^2 v_{B2} + 1) + B_1^2(1 - n^2 v_{A2}))) v_{B2} + (8(2 A_1 B_1 (1 - n^2 v_{A2}) + 2 B_1^2 n^2 v_{AB})) v_{AB} + 4 B_1^2 (1 - n^2 v_{A2}) v_{A2} \qquad (9)$$

$$Q_5 = -(2(4H_1 v_{AB} + 2G_1(-n^2 v_{B2} + 1) w_{AB} + 2G_1 n^2 v_{AB} v_{A2} + 2 n^2 v_A(-2 w_{AB} + w_{B2})))(G_1(1 - n^2 v_{A2}) w_{B2} + n^2 v_{B2} w_{A2} + 2 H_1 v_{B2}) - (2(2 H_1 v_{B2} + 2 H_1 v_{A2} + n^2 v_{A2} w_{A2} + n^2 v_{B2}(-2 w_{AB} + w_{B2}) + G_1(-n^2 v_{B2} + 1) w_{B2} + 4 G_1 n^2 v_{AB} w_{AB} + G_1(1 - n^2 v_{A2}) v_{A2})) \times (2 n^2 v_{AB} w_{A2} + 4 H_1 v_{AB} + 2 G_1 n^2 v_{AB} w_{B2} + 2 G_1(1 - n^2 v_{A2}) w_{AB}) + 16 B_1^2 n^2 v_{AB} v_{B2} - 8 A_1 B_1 n^2 (2 v_{A2} v_{B2} + 4 v_{AB}^2) + 16 A_1^2 n^2 v_{A2} v_{AB} - 8 A_1 B_1 n^2 v_{B2}^2 + 16 A_1^2 n^2 v_{AB} v_{B2} + (4(2 A_1^2 v_{AB} + 2 A_1 B_1(-n^2 v_{B2} + 1) + 2 A_1 B(1 - n^2 v_{A2}) + 2 B_1^2 n^2 v_{AB})) v_{B2} + (8(A_1^2(1 - n^2 v_{A2}) + 4 A_1 B_1 n^2 v_{AB} + B_1^2(-n^2 v_{B2} + 1) + B_1^2(1 - n^2 v_{A2}))) v_{AB} + (4(2 A_1 B_1(1 - n^2 v_{A2}) + 2 B_1^2 n^2 v_{AB})) v_{A2} \qquad (10)$$

$$Q_4 = (4(A_1^2(-n^2 v_{B2}) + A_1^2(1 - n^2 v_{A2}) + 4 A_1 B_1 n^2 v_{AB} B_1^2(-n^2 v_{B2} + 1))) v_{B2} + (8(2 A_1^2 n^2 v_{AB} + 2 A_1 B_1(-n^2 v_{B2} + 1) + 2 A_1 B_1(1 - n^2 v_{A2}) + 2 B_1^2 n^2 v_{AB})) v_{AB} + (4(A_1^2(1 - n^2 v_{A2}) + 4 A_1 B_1 n^2 v_{AB} + B_1^2(-n^2 v_{B2} + 1) + B_1^2(1 - n^2 v_{A2}))) v_{A2} + 4 B_1^2 n^2 (2 v_{A2} v_{B2} + 4 v_{AB}^2) - 32 A_1 B_1 n^2 v_{A2} v_{AB} 4 A_1^2 n^2 v_{A2} + 4 B_1^2 n^2 v_{B2}^2 - 32 A_1 B_1 n^2 v_{AB} v_{B2} + 4 A_1^2 n^2 (2 v_{A2} v_{B2} + 4 v_{AB}^2) - (2(G_1(-n^2 v_{B2} + 1) v_{A2} + n^2 v_{A2}(-2 w_{AB} + w_{B2}) + 2 H_1 v_{A2}))(G_1(1 - n^2 v_{A2}) w_{B2} + n^2 v_{B2} w_{A2} + 2 H_1 v_{B2}) - (2(4 H_1 v_{AB} + 2 G_1(-n^2 v_{B2} + 1) w_{AB} + 2 G_1 n^2 v_{AB} v_{A2} + 2 n^2 v_{AB}(-2 w_{AB} + w_{B2}))) \times (2 n^2 v_{AB} w_{A2} + 4 H_1 v_{AB} + 2 G_1 n^2 v_{AB} w_{B2} + 2 G_1(1 - n^2 v_{A2}) w_{AB}) - (2 H_1 v_{B2} + 2 H_1 v_{A2} + n^2 v_{A2} w_{A2} + n^2 v_{B2}(-2 w_{AB} + w_{B2}) + G_1(-n^2 v_{B2} + 1) w_{B2} + 4 G_1 n^2 v_{AB} w_{AB} + G_1(1 - n^2 v_{A2}) v_{A2})^2 \qquad (11)$$

$$Q_3 = -(2(G_1(-n^2 v_{B2} + 1) v_{A2} + n^2 v_{A2}(-2 w_{AB} + w_{B2}) + 2 H_1 v_{A2}))(2 n^2 v_{AB} w_{A2} + 4 H_1 v_{AB} + 2 G_1 n^2 v_{AB} w_{B2} + 2 G_1(1 - n^2 v_{A2}) w_{AB}) - (2(4 H_1 v_{AB} + 2 G_1(-n^2 v_{B2} + 1) w_{AB} + 2 G_1 n^2 v_{AB} v_{A2} + 2 n^2 v_{AB}(-2 w_{AB} + w_{B2}))) \times (2 H_1 v_{B2} + 2 H_1 v_{A2} + n^2 v_{A2} w_{A2} + n^2 v_{B2}(-2 w_{AB} + w_{B2}) + G_1(-n^2 v_{B2} + 1) w_{B2} + 4 G_1 n^2 v_{AB} w_{AB} + G_1(1 - n^2 v_{A2}) v_{A2}) + 16 B_1^2 n^2 v_{A2} v_{AB} - 8 A_1 B_1 n^2 v_{A2}^2 + 16 B_1^2 n^2 v_{AB} v_{B2} - 6 A_1 B_1 n^2 (2 v_{A2} v_{B2} + 4 v_{AB}^2) + 16 A_1^2 n^2 v_{A2} v_{AB} + (4(2 A_1^2 n^2 v_{AB} + 2 A_1 B_1(-n^2 v_{B2} + 1)) v_{B2} + (8(A_1^2(-n^2 v_{B2} + 1) + A_1^2(1 - n^2 v_{A2}) + 4 A_1 B_1 n^2 v_{AB} B_1^2(-n^2 v_{B2} + 1))) v_{AB} + (4(2 A_1^2 n^2 v_{AB} + 2 A_1 B_1(-n^2 v_{B2} + 1) + 2 A_1 B_1(1 - n^2 v_{A2}) + 2 B_1^2 n^2 v_{AB})) v_{A2} \qquad (12)$$

$$Q_2 = 4 A_1^2 (3 n^2 v_{B2} + 1) v_{B2} + (8(2 A_1^2 n^2 v_{AB} + 2 A_1 B_1 (-n^2 v_{B2} + 1))) v_{AB} + (4(A_1^2(-n^2 v_{B2} + 1) + A_1^2(1 - n^2 v_{A2}) + 4 A_1 B_1 n^2 v_{AB} + B_1^2(-n^2 v_{B2} + 1))) v_{A2} + 4 B_1^2 n^2 v_{A2}^2 + 4 B_1^2 n^2 (2 v_{A2} v_{B2} + 4 v_{AB}^2) - 32 A_1 B_1 n^2 v_{A2} v_{AB} + 4 A_1^2 n^2 v_{A2}^2 - (2(G_1(-n^2 v_{B2} + 1) v_{A2} + n^2 v_{A2}(-2 w_{AB} + w_{B2}) + 2 H_1 v_{A2})) \times (2 H_1 v_{B2} + 2 H_1 v_{A2} + n^2 v_{A2} w_{A2} n^2 v_{B2} (-2 w_{AB} + w_{B2}) + G_1(-n^2 v_{B2} + 1) w_{B2} + 4 G_1 n^2 v_{AB} w_{AB} G_1(1 - n^2 v_{A2}) v_{A2}) - (4 H_1 v_{AB} + 2 G_1(-n^2 v_{B2} + 1) w_{AB} + 2 G_1 n^2 v_{AB} v_{A2} + 2 n^2 v_{AB}(-2 w_{AB} + w_{B2}))^2 \qquad (13)$$

$$Q_1 = 8 A_1^2(-n^2 v_{B2} + 1) v_{AB} + (4(2 A_1^2 n^2 v_{AB} + 2 A_1 B_1(-n^2 v_{B2} + 1))) v_{A2} + 16 B_1^2 n^2 v_{A2} v_{AB} - 8 A_1 B_1 n^2 v_{A2}^2 - (2(G_1(-n^2 v_{B2} + 1) v_{A2} + n^2 v_{A2}(-2 w_{AB} + w_{B2}) + 2 H_1 v_{A2}))(4 H_1 v_{AB} + 2 G_1(-n^2 v_{B2} 1) w_{AB} + 2 G_1 n^2 v_{AB} v_{A2} + 2 n^2 v_{AB}(-2 w_{AB} + w_{B2})) \qquad (14)$$

$$Q_0 = 4 A_1^2(-n^2 v_{B2} + 1) v_{A2} - (G_1(-n^2 v_{B2} + 1) v_{A2} + n^2 v_{A2}(-2 w_{AB} + w_{B2}) + 2 H_1 v_{A2})^2 + 4 B_1^2 n^2 v^2_{A2} \qquad (15)$$

In this exemplary embodiment, equations (6)-(15) have at most three real roots; thus, for any four tangent lines, there are at most three possible ellipses that are tangent to all four lines and that satisfy the $a=a_0$ constraint. (In some instances, there may be fewer than three real roots.) For each real root θ, the corresponding values of $(x_C, y_C)$ and b can be readily determined, Depending on the particular inputs, zero or more solutions will be obtained; for example, in some instances, three solutions can be obtained for a typical configuration of tangents. Each solution is completely characterized by the parameters $\{\theta, a=a_0, b, (x_C, y_C)\}$. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Again with reference to FIG. 8, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 8-3, 8-4: 198B-1, 198B-2) to recognize variations in control object presence or motion indicating command information, related information, environmental information and other information discernable from the object, position, motion and attribute information that might be useful in controlling a machine. With reference to FIG. 8-3, 8-4, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B (see FIGS. 8-3, 8-4). In some embodiments, virtual constructs (e.g., a virtual object defined in space; such that variations in real objects relative to the virtual construct, when detected, can be interpreted for control or other purposes (see FIGS. 8-3, 8-4)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

Further with reference to FIG. 8, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments and with reference to FIGS. 8-3, 8-4, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 8-3: 189-2, 189-3, FIG. 8-4: 189B) or combinations thereof.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 9:
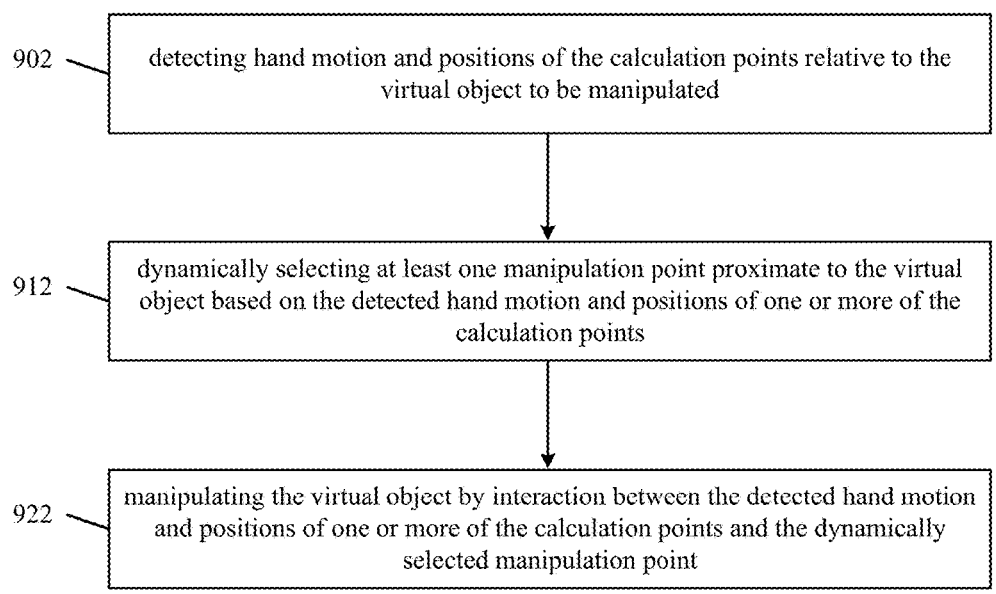
FIG. 9 shows a flowchart of simplified manipulation of virtual objects by detected hand motions.

FIG. 9 shows a flowchart of simplified manipulation of virtual objects by detected hand motions. A detected hand includes calculation points of potential interaction with a manipulation point of a virtual object. Flowchart shown in FIG. 9 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 9. Multiple actions can be combined in some implementations. For convenience, this flowchart is described with reference to the system that carries out a method. The system is not necessarily part of the method.

At action 902, hand motion and positions of the calculation points are detected relative to the virtual object to be manipulated. The method further includes detecting opposable motion and positions of the calculation points of the hand. In some embodiments, the calculation points include finger tips and a base of the hand.

At action 912, at least one manipulation point proximate to the virtual object is dynamically selected based on the detected hand motion and positions of one or more of the calculation points. Also, the dynamically selected manipulation point is selected from a predetermined list of available manipulation points for a particular form of the virtual object. In addition, the dynamically selected manipulation point is created proximate to the virtual object based on the detected hand motion and positions of the calculation points.

In one embodiment, the method includes detecting opposable motion and positions of the calculation points of the hand, detecting the manipulation point proximate to a point of convergence of the opposable calculation points, and assigning a strength attribute to the manipulation point based on a degree of convergence of the opposable calculation points.

In one another embodiment, the method includes detecting motion of two hands, dynamically selecting two manipulation points proximate to opposed sides of the virtual object, defining a selection plane through the virtual object linking the two manipulation points, and manipulating the virtual object responsive to manipulation of the selection plane.

In yet another embodiment, the method includes dynamically selecting an anchor point for the hand proximate to a grasp point of two or more of the calculation points of the hand, assigning a strength attribute to the anchor point based on a degree of convergence to the dynamically selected anchor points, and manipulating the virtual object responsive to the anchor point strength attribute when the anchor point and the manipulation point are within a predetermined range of each other. In some embodiments, the grasp point of a pinch gesture includes convergence of at least two opposable finger or thumb contact points. In other embodiments, the grasp point of a grab gesture includes convergence of a palm contact point with at least one opposable finger contact points.

At action 922, the virtual object is manipulated by interaction between the detected hand motion and positions of one or more of the calculation points and the dynamically selected manipulation point. In some embodiments, the hand and the virtual object both have anchor points and force applied by the calculation points through the manipulation point is calculated between a hand anchor point and a virtual object anchor point.

In one embodiment, the method includes generating data for augmented display representing a position of the virtual object relative to a direct view of the detected hand. In another embodiment, the method includes generating data for display representing positions in a rendered virtual space of the virtual object and the detected hand. In one another embodiment, the virtual object is manipulated responsive to a proximity between a virtual representation of the detected hand generated using the data for display and the manipulation point of the virtual object.

One embodiment includes detecting hand motion and positions of the calculation points relative to two or more virtual objects to be manipulated, dynamically selecting one or more manipulation points proximate to at least one of the virtual objects based on the detected hand motion and positions of one or more of the calculation points, and manipulating at least one of the virtual objects by interaction between the detected hand motion and positions of one or more of the calculation points and the dynamically selected manipulation points.

One embodiment includes detecting hand motion and positions of calculation points relative to two or more virtual objects to be manipulated, manipulating a first virtual object by interaction between the detected hand motion and at least one virtual manipulation point of the first virtual object, dynamically selecting at least one manipulation point of a second virtual object responsive to convergence of calculation points of the first virtual object, and manipulating the second virtual object when the virtual manipulation point of the first virtual object and the virtual manipulation point of the second virtual object are within a predetermined range of each other.

Figure 10:
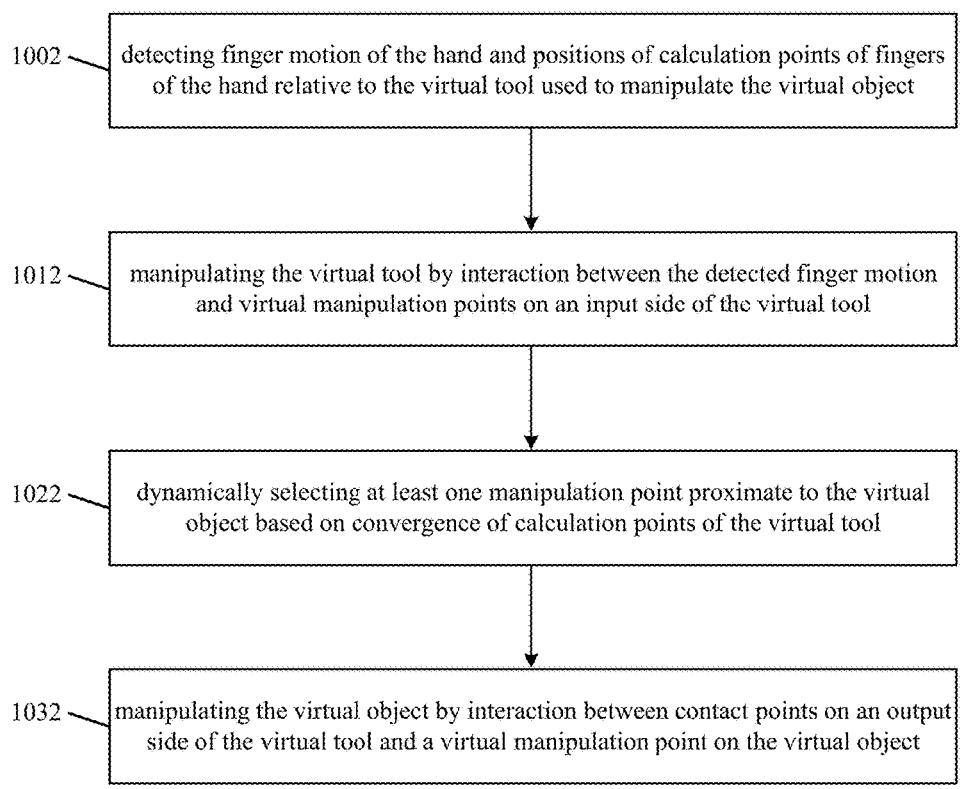
FIG. 10 is a representative method of simplified manipulation of virtual objects by detected hand motions.

FIG. 10 is a representative method of simplified manipulation of virtual objects by detected hand motions. A detected hand includes calculation points of potential interaction with a manipulation point of the virtual tool. Flowchart shown in FIG. 10 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 10. Multiple actions can be combined in some implementations. For convenience, this flowchart is described with reference to the system that carries out a method. The system is not necessarily part of the method.

At action 1002, finger motion of the hand and positions of calculation points of fingers of the hand are detected relative to the virtual tool used to manipulate the virtual object. In one embodiment, the virtual tool is a scissor and manipulating the virtual Object further includes cutting the virtual object. In another embodiment, the virtual tool is a scalpel and manipulating the virtual object further includes slicing the virtual object.

The method further includes detecting opposable motion and positions of the calculation points of the fingers of the hand.

At action 1012, the virtual tool is manipulated by interaction between the detected finger motion and virtual manipulation points on an input side of the virtual tool. The method further includes detecting opposable motion and positions of the calculation points of the fingers of the hand, detecting the manipulation point proximate to a point of convergence of the opposable calculation points, and assigning a strength attribute to the manipulation point based on a degree of convergence of the opposable calculation points.

At action 1022, at least one manipulation point proximate to the virtual object is dynamically selected based on convergence of calculation points of the virtual tool. In some embodiments, the dynamically selected manipulation point is selected from a predetermined list of available manipulation points for a particular form of the virtual object. In other embodiments, the dynamically selected manipulation point is created proximate to the virtual object based on the detected finger motion and positions of the calculation points.

At action 1032, the virtual object is manipulated by interaction between contact points on an output side of the virtual tool and a virtual manipulation point on the virtual object.

In some embodiments, the fingers and the virtual object both have anchor points and force applied by the calculation points through the manipulation point is calculated between a finger anchor point and a virtual object anchor point.

In one embodiment, the method includes generating data for augmented display representing a position of the virtual object relative to a direct view of the detected hand. In another embodiment, the method includes generating data for display representing positions in a rendered virtual space of the virtual object and the detected hand. In one another embodiment, the virtual object is manipulated responsive to a proximity between a virtual representation of the detected hand generated using the data for display and the manipulation point of the virtual object.

Figure 11:
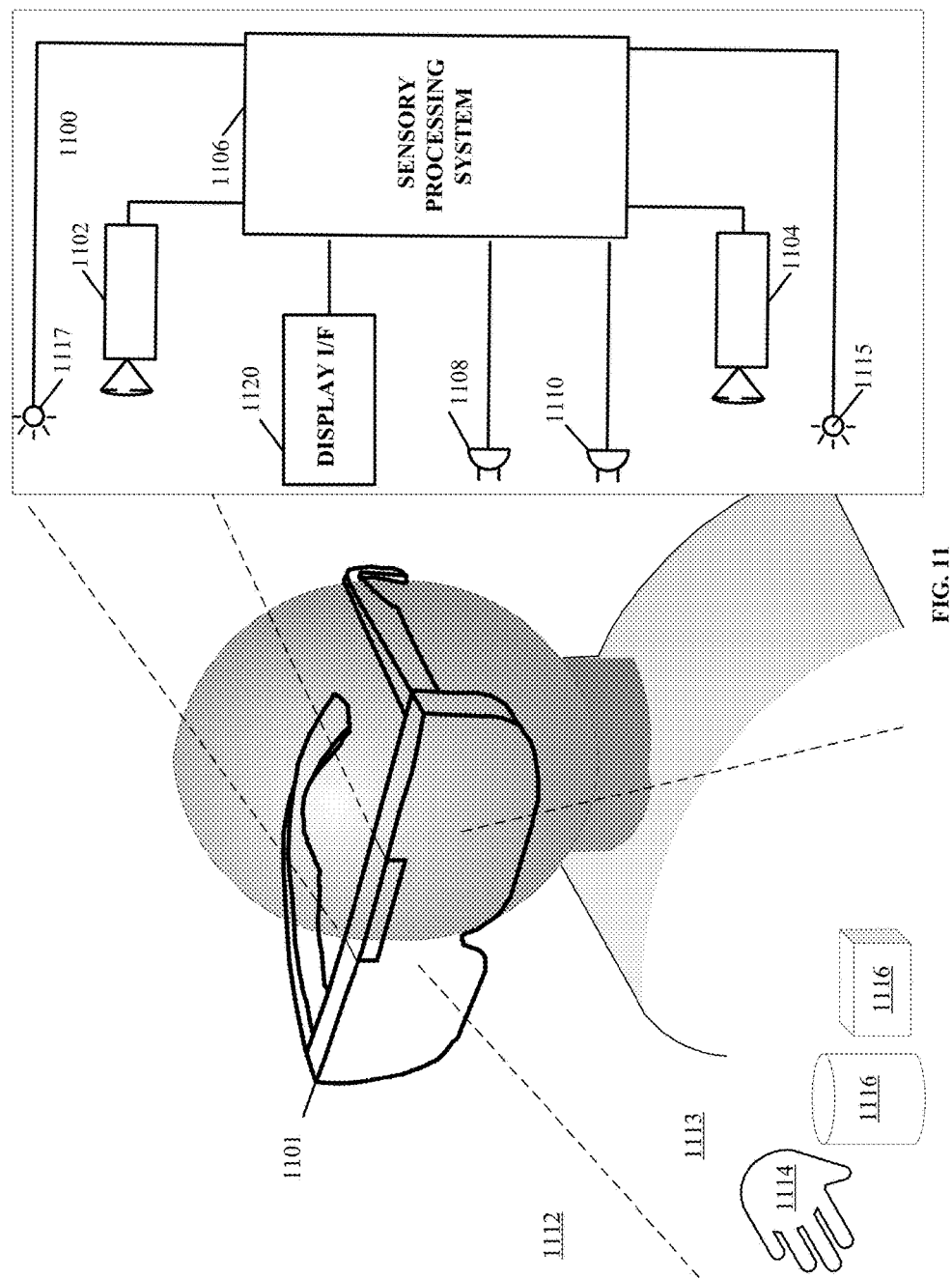
FIG. 11 illustrates a system for capturing image and other sensory data according to an implementation of the technology disclosed.

FIG. 11 illustrates a system for capturing image and other sensory data according to an implementation of the technology disclosed.

Refer first to FIG. 11, which illustrates a system for capturing image data according to one implementation of the technology disclosed. System 1100 is preferably coupled to a wearable device 1101 that can be a personal head mounted display (HMD) having a goggle form factor such as shown in FIG. 11, a helmet form factor, or can be incorporated into or coupled with a watch, smartphone, or other type of portable device.

In various implementations, the system and method for capturing 3D motion of an object as described herein can be integrated with other applications, such as a head-mounted device or a mobile device. Referring again to FIG. 11, a head-mounted device 1101 can include an optical assembly that displays a surrounding environment or a virtual environment to the user; incorporation of the motion-capture system 1100 in the head-mounted device 1101 allows the user to interactively control the displayed environment. For example, a virtual environment can include virtual objects that can be manipulated by the user's hand gestures, which are tracked by the motion-capture system 1100. In one implementation, the motion-capture system 1100 integrated with the head-mounted device 1101 detects a position and shape of user's hand and projects it on the display of the head-mounted device 1100 such that the user can see her gestures and interactively control the objects in the virtual environment. This can be applied in, for example, gaming or Internet browsing.

System 1100 includes any number of cameras 1102, 1104 coupled to sensory processing system 1106. Cameras 1102, 1104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 1102, 1104 are preferably capable of capturing video images (i.e., successive image frames at a constant rate of at least 15 frames per second); although no particular frame rate is required. The capabilities of cameras 1102, 1104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 1102, 1104 can be oriented toward portions of a region of interest 1112 by motion of the device 1101, in order to view a virtually rendered or virtually augmented view of the region of interest 1112 that can include a variety of virtual objects 1116 as well as contain an object of interest 1114 (in this example, one or more hands) moves within the region of interest 1112. One or more sensors 1108, 1110 capture motions of the device 1101. In some implementations, one or more light sources 1115, 1117 are arranged to illuminate the region of interest 1112. In some implementations, one or more of the cameras 1102, 1104 are disposed opposite the motion to be detected, e.g., where the hand 1114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 1106, which can be, e.g., a computer system, can control the operation of cameras 1102, 1104 to capture images of the region of interest 1112 and sensors 1108, 1110 to capture motions of the device 1101. Information from sensors 1108, 1110 can be applied to models of images taken by cameras 1102, 1104 to cancel out the effects of motions of the device 1101, providing greater accuracy to the virtual experience rendered by device 1101. Based on the captured images and motions of the device 1101, sensory processing system 1106 determines the position and/or motion of object 1114.

For example, as an action in determining the motion of object 1114, sensory processing system 1106 can determine which pixels of various images captured by cameras 1102, 1104 contain portions of object 1114. In some implementations, any pixel in an image can be classified as an "object" pixel or a "background" pixel depending on whether that pixel contains a portion of object 1114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 1102, 1104 and cancelling out captured motions of the device 1101 from sensors 1108, 1110 allows sensory processing system 1106 to determine the location in 3D space of object 1114, and analyzing sequences of images allows sensory processing system 1106 to reconstruct 3D motion of object 1114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 1120 employs projection techniques in conjunction with the sensory based tracking in order to present virtual (or virtualized real) objects (visual, audio, haptic, and so forth) created by applications loadable to, or in cooperative implementation with, the device 1101 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging 1102, 1104 or acoustic or other sensory devices. Control information is communicated to a system based in part on a combination of the motion of the portable device 1101 and the detected motion of the user determined from the sensory information received from imaging 1102, 1104 or acoustic or other sensory devices. The virtual device experience can be augmented in some implementations by the addition of haptic, audio and/or other sensory information projectors. For example, an optional video projector 1120 can project an image of a page (e.g., virtual device) from a virtual book object superimposed upon a real world object, e.g., desk 1116 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 1114 is projected to the user, so that the scene looks to the user as if the user is looking at the user's own hand(s).

A plurality of sensors 1108, 1110 coupled to the sensory processing system 1106 to capture motions of the device 1101. Sensors 1108, 1110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 1100 can include any of various other sensors not shown in FIG. 11 for clarity, alone or in various combinations, to enhance the virtual experience provided to the user of device 1101. For example, in low-light situations where free-form gestures cannot be recognized optically with a sufficient degree of reliability, system 1106 may switch to a touch mode in which touch gestures are recognized based on acoustic or vibrational sensors. Alternatively, system 1106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 1106 from a standby mode to an operational mode. For example, the system 1106 may enter the standby mode if optical signals from the cameras 1102, 104 are absent for longer than a threshold interval.

It will be appreciated that the Figures shown in FIG. 11 are illustrative. In some implementations, it may be desirable to house the system 1100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of simplified manipulation of virtual objects by detected hand motions, wherein a detected hand includes calculation points of potential interaction with a manipulation point of a virtual object, the method including:
   receiving a virtual object to be manipulated;
   detecting hand motion made by a hand relative to the virtual object to be manipulated and determining positions of a plurality of calculation points for the hand;
   dynamically selecting at least one manipulation point inferring where an interaction will take place that is proximate to the virtual object to be manipulated based on the detected hand motion and determining a weighted average of distance from each position of the plurality of the calculation points to an anchor point selected based on the hand motion detected;
   manipulating the virtual object by interaction between the detected hand motion and positions of one or more of the calculation points and the at least one manipulation point selected dynamically; and
   displaying across a display a representation of manipulating the virtual object by the hand and hand motion detected;
   wherein the hand and the virtual object both have anchor points and force applied by the calculation points through the manipulation point is calculated between a hand anchor point and a virtual object anchor point.

2. The method of claim 1, further including detecting opposable motion and positions of the calculation points of the hand.

3. The method of claim 1, further including:
   detecting an opposable motion made by at least two opposable calculation points defined for the hand;
   determining the manipulation point that is proximate to a point of convergence of the opposable calculation points; and assigning a strength attribute to the manipulation point based on a degree of convergence of the opposable calculation points.

4. The method of claim 1, wherein the manipulation point is selected from a predetermined list of available manipulation points for a particular form of the virtual object.

5. The method of claim 1, wherein the manipulation point is created proximate to the virtual object based on a weighted average of a distance from each calculation point positions of the calculation points to an anchor point selected based on the hand motion detected.

6. The method of claim 1, further including generating data for augmented display representing a position of the virtual object relative to a direct view of the detected hand.

7. The method of claim 1, further including generating data for display representing positions in a rendered virtual space of the virtual object and the detected hand.

8. The method of claim 7, further including manipulating the virtual object responsive to a proximity between a virtual representation of the detected hand generated using the data for display and the manipulation point of the virtual object.

9. The method of claim 1, wherein the calculation points include finger tips and a base of the hand.

10. The method of claim 1, further including:
detecting motion made by two hands;
dynamically selecting using calculation points of each of the two hands, two manipulation points, proximate to opposed sides of the virtual object;
defining a selection plane through the virtual object linking the two manipulation points; and
manipulating the virtual object responsive to manipulation of the selection plane.

11. The method of claim 1, further including:
dynamically selecting an anchor point for two or more of the calculation points of the hand; wherein the anchor point is selected according to a type of an interaction and a grasp point comprising a location where the interaction is intended to occur;
assigning an anchor point strength attribute to the anchor point based on a degree of convergence of two or more of the calculation points of the hand to the anchor point; and
manipulating the virtual object responsive to the anchor point strength attribute when the anchor point and the manipulation point are within a predetermined range of each other.

12. The method of claim 11, wherein the grasp point for a pinch gesture includes convergence of at least two opposable finger or thumb calculation points.

13. The method of claim 11, wherein the grasp point for a grab gesture includes convergence of a palm calculation point with at least one calculation point on an opposable finger or thumb.

14. The method of claim 1, further including:
detecting hand motion made by a hand relative to two or more virtual objects to be manipulated and determining positions of the calculation points;
dynamically selecting one or more manipulation points that are proximate to at least one of the virtual objects to be manipulated based on the hand motion detected and the positions of the calculation points; and
manipulating at least the virtual objects by interaction between the hand motion detected and positions of one or more of the calculation points and the manipulation points selected dynamically.

15. The method of claim 14, further including:
detecting hand motion made by a hand relative to two or more virtual objects to be manipulated and determining positions of the calculation points;
manipulating a first virtual object by interaction between the hand motion detected and at least one virtual manipulation point determined for the first virtual object;
dynamically selecting at least one manipulation point of a second virtual object responsive to convergence of two or more calculation points of the hand proximate to the first virtual object; and
manipulating the second virtual object when the virtual manipulation point of the first virtual object and the virtual manipulation point of the second virtual object are within a predetermined range of each other.

16. A method of simplifying manipulation of a virtual object using detected hand motions that operate a virtual tool, wherein a detected hand includes calculation points of potential interaction with a manipulation point of the virtual tool, the method including:
receiving a virtual tool to manipulate a virtual object;
detecting a finger motion made by a finger of a hand and determining positions of a plurality of calculation points for fingers of the hand relative to the virtual tool used to manipulate the virtual object;
manipulating the virtual tool by interaction between the finger motion detected and two or more virtual tool manipulation points determined on an input side of the virtual tool;
dynamically selecting at least one virtual object manipulation point inferring where an interaction will place that is proximate to the virtual object to be manipulated based on a detected convergence of two or more virtual tool manipulation points determined using a weighted average of distances from positions of the plurality of calculation points to an anchor point selected based upon the finger motion detected; and
manipulating the virtual object by determining an interaction between one or more contact points on an output side of the virtual tool and the virtual object manipulation point on the virtual object; and
displaying across a display a representation of manipulating the virtual object by the hand using the virtual tool based upon the finger motion detected.

17. The method of claim 16, wherein the virtual tool is a virtualized representation of a scissor and manipulating the virtual object further includes virtually cutting the virtual object using the virtualized representation of a scissor.

18. The method of claim 16, wherein the virtual tool is a virtualized representation of a scalpel and manipulating the virtual object further includes virtually slicing the virtual object using the virtualized representation of a scalpel.

19. The method of claim 16, further including detecting opposable motion and positions of the calculation points of the fingers of the hand.

20. The method of claim 16, further including:
detecting an opposable motion made by at least two opposable calculation points defined for fingers of the hand;
determining the manipulation point that is proximate to a point of convergence of the at least two opposable calculation points; and
assigning a strength attribute to the manipulation point based on a degree of convergence of the at least two opposable calculation points.

21. The method of claim 16, wherein the manipulation point is selected from a predetermined list of available manipulation points for a particular form of the virtual object.

22. The method of claim 16, wherein the manipulation point is created proximate to the virtual object based on the finger motion detected and positions of the calculation points.

23. The method of claim 16, wherein fingers and the virtual object both have anchor points and force applied by the calculation points through the manipulation point is calculated between a finger anchor point and a virtual object anchor point.

24. The method of claim 16, further including generating data for augmented display representing a position of the virtual object relative to a direct view of the detected hand.

25. The method of claim 16, further including generating data for display representing positions in a rendered virtual space of the virtual object and the detected hand.

* * * * *